US011698538B2

(12) United States Patent
Wheelwright et al.

(10) Patent No.: US 11,698,538 B2
(45) Date of Patent: Jul. 11, 2023

(54) MULTIPASS SCANNER FOR NEAR-EYE DISPLAY

(71) Applicant: Meta Platforms Technologies, LLC, Menlo Park, CA (US)

(72) Inventors: Brian Wheelwright, Sammamish, WA (US); Weichuan Gao, Redmond, WA (US); Babak Amirsolaimani, Redmond, WA (US); Ying Geng, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 7 days.

(21) Appl. No.: 17/555,097

(22) Filed: Dec. 17, 2021

(65) Prior Publication Data
US 2022/0107504 A1  Apr. 7, 2022

Related U.S. Application Data

(63) Continuation of application No. 16/653,358, filed on Oct. 15, 2019, now Pat. No. 11,237,402.

(51) Int. Cl.
*G02B 26/08* (2006.01)
*G02B 27/18* (2006.01)
(Continued)

(52) U.S. Cl.
CPC ............... *G02B 27/18* (2013.01); *G02B 5/10* (2013.01); *G02B 5/3083* (2013.01); *G02B 9/06* (2013.01);
(Continued)

(58) Field of Classification Search
CPC ........ G02B 27/18; G02B 5/10; G02B 5/3083; G02B 9/06; G02B 26/0833; G02B 26/105;
(Continued)

(56) References Cited

U.S. PATENT DOCUMENTS 9,523,852 B1   12/2016  Brown et al.
9,958,684 B1    5/2018  Robbins
(Continued)

FOREIGN PATENT DOCUMENTS

EP   3098642 A1   11/2016

OTHER PUBLICATIONS

International Search Report and Written Opinion for International Application No. PCT/US2020/052449, dated Feb. 4, 2021, 16 Pages.
(Continued)

*Primary Examiner* — Euncha P Cherry
(74) *Attorney, Agent, or Firm* — Pequignot + Myers; Matthew A. Pequignot

(57) ABSTRACT

A multipass scanner usable e.g. in a near-eye display is disclosed. The multipass scanner scans a light beam angularly, forming an image in angular domain. The multipass scanner includes a light source, a tiltable reflector, and a multipass coupler that couples light emitted by the light source to the tiltable reflector, receives the reflected light and couples it back to the tiltable reflector to double the scanning angle. Then, the multipass coupler couples the light reflected at least twice from the tiltable reflector to an exit pupil of the scanner. A pupil-replicating waveguide disposed at the exit pupil of the scanner extends the image in angular domain. Multiple reflections of the light beam from the tiltable reflector enable one to increase the angular scanning range and associated field of view of the display without having to increase the angular scanning range of the tiltable reflector.

20 Claims, 19 Drawing Sheets

(51) Int. Cl.
  *G02B 5/10*    (2006.01)
  *G02B 5/30*    (2006.01)
  *G02B 9/06*    (2006.01)
  *G02B 26/10*   (2006.01)
  *G02B 27/00*   (2006.01)
  *G02B 27/28*   (2006.01)

(52) U.S. Cl.
  CPC ....... *G02B 26/0833* (2013.01); *G02B 26/105* (2013.01); *G02B 27/0081* (2013.01); *G02B 27/283* (2013.01)

(58) Field of Classification Search
  CPC .............. G02B 27/0081; G02B 27/283; G02B 17/0856; G02B 2027/0125; G02B 2027/0187; G02B 26/101; G02B 27/0172; G02B 26/10
  See application file for complete search history.

(56) References Cited

U.S. PATENT DOCUMENTS

2016/0349494 A1    12/2016  Dohi
2018/0149862 A1     5/2018  Kessler et al.
2020/0409156 A1*   12/2020  Sissom ................ G02B 27/017

OTHER PUBLICATIONS

International Preliminary Report on Patentability for International Application No. PCT/US2020/052449, dated Apr. 28, 2022, 13 pages.

* cited by examiner

MULTIPASS SCANNER FOR NEAR-EYE DISPLAY

REFERENCE TO RELATED APPLICATION

The present invention is a continuation of U.S. patent application Ser. No. 16/653,358 filed on Oct. 15, 2019 and incorporated herein by reference in its entirety.

TECHNICAL FIELD

The present disclosure relates to wearable headsets, and in particular to components and modules for wearable visual display headsets.

BACKGROUND

Head mounted displays (HMDs), helmet mounted displays, near-eye displays (NEDs), and the like are being increasingly used for displaying virtual reality (VR) content, augmented reality (AR) content, mixed reality (MR) content, etc. Such displays are finding applications in diverse fields including entertainment, education, training and biomedical science, to name just a few examples. The displayed VR/AR/MR content can be three-dimensional (3D) to enhance the experience and to match virtual objects to real objects observed by the user. Eye position and gaze direction, and/or orientation of the user may be tracked in real time, and the displayed imagery may be dynamically adjusted depending on the user's head orientation and gaze direction, to provide a better experience of immersion into a simulated or augmented environment.

Compact display devices are desired for head-mounted displays. Because a display of HMD or NED is usually worn on the head of a user, a large, bulky, unbalanced, and/or heavy display device would be cumbersome and may be uncomfortable for the user to wear.

Projector-based displays, e.g. scanning projector displays, provide images in angular domain, which can be observed by a user's eye directly, without an intermediate screen or a display panel. A pupil-replicating waveguide is used to carry the image in angular domain to the user's eye. The lack of a screen or a display panel in a scanning projector display enables size and weight reduction of the display. The image may be obtained by scanning a light beam over the field of view (FOV) of the display.

BRIEF DESCRIPTION OF THE DRAWINGS

Exemplary embodiments will now be described in conjunction with the drawings, in which.

DETAILED DESCRIPTION

Figure 1:
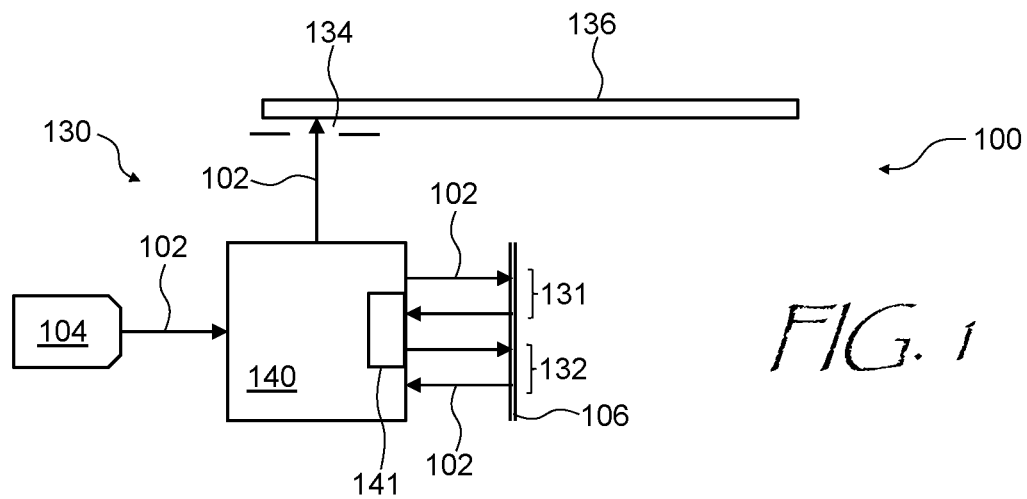
FIG. 1 is a schematic block diagram of a near-eye display including a multipass scanner of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1-3, 4A-4B, 5A-5B, 6A-6E, 7, 8, 9A-9B, 10A-10B and 11A-11B, similar reference numerals denote similar elements.

A scanning projector display requires an optical scanner, which is typically based on a tiltable reflector. The scanner should be capable of scanning a light beam over the entire field of view (FOV) of the display. As the light beam is scanned, its brightness and/or color may vary in coordination with the scanning, to provide an image in angular domain. The light beam may be scanned in two directions, e.g. over X- and Y-viewing angles. When the frame rate is high enough, the eye integrates the scanned light beam, enabling the user to see the displayed imagery substantially without flicker.

One challenge of constructing a scanning display with a tiltable reflector is the required angular scanning range of the tiltable reflector. A large scanning range requires compromises is other parameters, including flexure stiffness and scan rate (frequency). Thin, flexible hinges cannot support a larger reflector required to provide a desired beam size and image quality. In accordance with this disclosure, a light beam may be made to impinge multiple times onto a same tiltable reflector, thereby multiplying the scanning range without having to increase the maximum tilting angle of the reflector.

In accordance with the present disclosure, there is provided a multipass scanner for scanning a light beam. The multipass scanner includes a light source for providing the light beam, a tiltable reflector for reflecting the light beam provided by the light source by tilting the tiltable reflector at a variable angle, and a multipass coupler for receiving the light beam from the light source and coupling the light beam to the tiltable reflector; for receiving the light beam reflected from the tiltable reflector for a first time at twice the variable angle and redirecting the light beam back to the tiltable reflector; and for receiving the light beam reflected from the tiltable reflector for a second time and coupling the light beam to an exit pupil of the multipass scanner.

The multipass coupler may include a reflective polarizer for reflecting light having a first polarization state and transmitting light having a second polarization state orthogonal to the first polarization state; and a first quarter-wave waveplate (QWP) disposed in an optical path between the reflective polarizer and the tiltable reflector and configured to convert a polarization state of light between the first and second polarization states upon a double-pass propagation through the first QWP. In operation, the light beam having the second polarization state propagates in sequence through the reflective polarizer and the first QWP, impinges onto the tiltable reflector for the first time, is reflected by the tiltable reflector to propagate again through the first QWP thereby converting to the first polarization state, is reflected by the reflective polarizer, propagates through the first QWP and impinges onto the tiltable reflector for the second time, is reflected by the tiltable reflector to propagate through the first QWP thereby converting back to the second polarization state, and propagates through the reflective polarizer to the exit pupil.

The multipass coupler may include a first lens element having positive optical power and comprising a convex surface proximate the tiltable reflector, the convex surface supporting the reflective polarizer, and a second lens element disposed between the first lens element and the exit pupil. In operation, the light beam provided by the light source propagates in sequence though the second lens element, through the first lens element, impinges onto the tiltable reflector, is reflected by the reflective polarizer to impinge onto and get reflected by the tiltable reflector for the second time, propagates through the first lens element, propagates through the second lens element, and impinges onto the exit pupil of the multipass scanner. In some embodiments, the second lens element includes first and second coaxial optical surfaces, the first optical surface facing the first lens element; a side face between the first and second optical surfaces for inputting the light beam provided by the light source into the second lens element; and a buried turn mirror within the second lens element in an optical path of the light beam inputted through the side face of the second lens element, for turning the light beam towards the first optical surface of the second lens element.

In some embodiments, the multipass scanner includes a polarization beamsplitter (PBS) for reflecting light having the first polarization state and transmitting light having the second polarization state. First and second curved reflectors may be disposed proximate adjoining surfaces of the PBS for reflecting the light beam exiting the PBS back towards the PBS, wherein the first curved reflector and the reflective polarizer are disposed on opposite sides of the PBS, and wherein the second curved reflector and the tiltable reflector are disposed on opposite sides of the PBS. A second QWP may be disposed in an optical path between the PBS and the first curved reflector and configured to convert a polarization state of light between the first and second polarization states upon a double-pass propagation through the second QWP. A third QWP may be disposed in an optical path between the PBS and the second curved reflector and configured to convert a polarization state of light between the first and second polarization states upon a double-pass propagation through the second QWP. In operation, the light beam provided by the light source propagates in sequence: through an opening in the first curved reflector, through the second QWP, impinges, while in the first polarization state, onto the PBS, is reflected by the PBS towards the tiltable reflector, propagates through the first QWP, is reflected by the tiltable reflector for the first time, propagates again through the first QWP thereby converting to the second polarization state, propagates through the PBS and the third QWP, impinges onto the second curved reflector, propagates through the third QWP again thereby converting to the first polarization state, and is reflected by the PBS towards the reflective polarizer. The light beam reflected by the PBS towards the reflective polarizer in the first polarization state propagates back towards the PBS, is reflected by the PBS towards the second curved reflector, propagates through the third QWP, is reflected by the second curved reflector to propagate again through the third QWP thereby converting to the second polarization state, propagates through the PBS, through the first QWP, and is reflected by the tiltable reflector for the second time towards the PBS. The light beam reflected by the tiltable reflector for the second time propagates again through the first QWP thereby converting to the first polarization state, is reflected by the PBS to the first curved reflector, propagates through the second QWP, is reflected by the first curved reflector, propagates again through the second QWP thereby converting to the second polarization state, propagates through PBS, and propagates through the reflective polarizer to the exit pupil.

In some embodiments, the multipass scanner further includes a first lens element in an optical path between the PBS and the tiltable reflector, and a second lens element in an optical path between the PBS and the reflective polarizer. In embodiments where the multipass coupler comprises a first coupler portion for coupling light provided by the light source to the tiltable reflector, the multipass coupler may include a reflector for reflecting light from the tiltable reflector back towards the tiltable reflector. The multipass coupler may further include a second coupler portion comprising a pupil auto-relay for relaying light reflected by the tiltable reflector for the first time back to the tiltable reflector, and a third coupler portion for relaying light reflected by the tiltable reflector for the second time to the exit pupil of the multipass scanner.

In accordance with the present disclosure, there is provided a near-eye display for providing an image in angular domain at an eyebox. The near-eye display includes a light source for providing a light beam; a tiltable reflector for reflecting the light beam provided by the light source by tilting the tiltable reflector at a variable angle; a pupil-replicating waveguide for receiving the light beam tilted by the tiltable reflector and expanding the light beam over the eyebox by providing multiple portions of the light beam over the eyebox; and a multipass coupler for receiving the light beam from the light source and coupling the light beam to the tiltable reflector; for receiving the light beam reflected from the tiltable reflector for a first time at twice the variable angle and redirecting the light beam back to the tiltable reflector; and for receiving the light beam reflected from the tiltable reflector for a second time and coupling the light beam to the pupil-replicating waveguide.

In embodiments where the light source and the multipass coupler are disposed on opposite sides of the pupil-replicating waveguide, the pupil-replicating waveguide may include an opening therein for propagating the light beam provided by the light source therethrough for coupling to the multipass coupler. The tiltable reflector may include a tiltable microelectromechanical system (MEMS) reflector. The multipass coupler may include a pupil auto-relay for relaying light reflected by the tiltable reflector for the first time back to the tiltable reflector.

In accordance with the present disclosure, there is further provided a near-eye display for providing an image in angular domain at an eyebox. The near-eye display may include a first light source for providing a first light beam; a second light source for providing a second light beam; a tiltable reflector for reflecting the first and second light beams at a variable angle; a pupil-replicating waveguide for receiving the first and second light beams tilted by the tiltable reflector and expanding the first and second light beams over the eyebox by providing multiple portions of the first and second light beams over the eyebox. The pupil-replicating waveguide may include a polarization-selective in-coupler for in-coupling light in a first polarization state while transmitting through light in a second polarization state orthogonal to the first polarization state. The near-eye display further includes a pupil-replicating waveguide for receiving the light beam tilted by the tiltable reflector and expanding the light beam over the eyebox by providing multiple portions of the light beam over the eyebox; and a multipass coupler for receiving the light beam from the light source and coupling the light beam to the tiltable reflector; for receiving the light beam reflected from the tiltable reflector for a first time at twice the variable angle and redirecting the light beam back to the tiltable reflector; and for receiving the light beam reflected from the tiltable reflector for a second time and coupling the light beam to the pupil-replicating waveguide. The first and second light sources may be disposed on an opposite side of the pupil-replicating waveguide from the first and second curved reflectors.

Im embodiments where the first and second light sources are disposed on a same side of the pupil-replicating waveguide as the first and second curved reflectors, the near-eye display may further include a first folding mirror in an optical path between the first light source and the first curved reflector; and a second folding mirror in an optical path between the second light source and the second curved reflector.

Referring to FIG. 1, a near-eye display 100 includes a multipass scanner 130 optically coupled to a pupil-replicating waveguide 136. The multipass scanner 130 may be used to provide an image in angular domain to the pupil-replicating waveguide 136 by scanning a light beam 102 of a variable brightness and/or color over a display's FOV. The light beam 102 is emitted by a light source 104.

The multipass scanner 130 includes a tiltable reflector 106 for reflecting the light beam 102 provided by the light source 102. The light beam 102 is scanned, or steered, by tilting the tiltable reflector 106 at a variable angle. The tiltable reflector 106 may include a microelectromechanical (MEMS) reflector tiltable at a controllable angle by applying a control signal to its electrodes. The MEMS reflector may include a mirror and/or a grating, for example. The multipass scanner 130 further includes a multipass coupler 140 configured for receiving the light beam 102 from the light source 102 and coupling the light beam 102 to the tiltable reflector 106. The multipass coupler 140 directs the light beam 102 to the tiltable reflector 106 and receives the light beam 102 reflected from the tiltable reflector 106 for a first time (event 131) at twice the angle of tilt of the tiltable reflector 106, and redirects the light beam 102 back to the tiltable reflector 106 for a secondary reflection. A portion 141 of the multipass coupler 140 that couples the light beam 102 back to the tiltable reflector 106 may include e.g. a mirror or a pupil auto-relay. Examples of both will be considered further below.

The multipass coupler 140 redirects the light beam 102 back to the tiltable reflector 106 and receives the light beam 102 reflected from the tiltable reflector for a second time (event 132) at an increased angle of four times the variable angle, and couples the light beam to an exit pupil 134 of the multipass scanner 130. The increased angle of the light beam 102 is due to multiple reflections from the tiltable reflector 106. The pupil-replicating waveguide 136 may be disposed proximate the exit pupil 134 for receiving the light beam at four times the variable angle of tilt of the tiltable reflector 106. In some embodiments, the multipass coupler 140 has an optical magnification factor between the light source 104 and the exit pupil 102 of greater or smaller than unity, in which case the angle of the light beam 102 at the exit pupil 134 may be different from four times the tilt angle of the tiltable reflector 106, but is typically larger than the tilt angle of the tiltable reflector 106.

Figure 2:
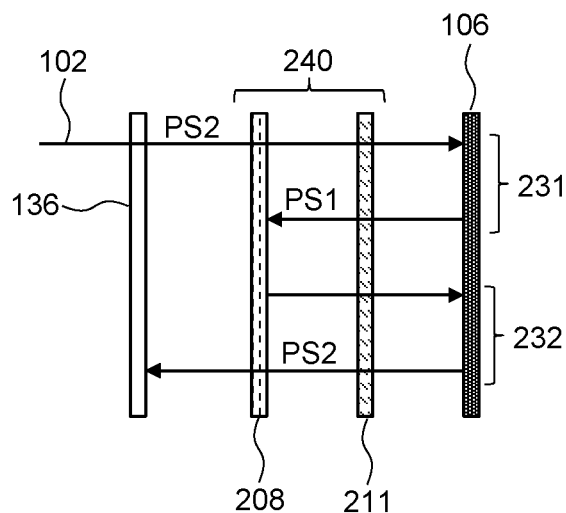
FIG. 2 is a schematic diagram of a polarization-based multipass coupler using polarization diversity to ensure a double reflection of a light beam from a same tiltable reflector.

In some embodiments, the multipass coupler 140 may be based on a polarization diversity configuration ensuring a double reflection of the light beam 102 from the tiltable mirror 106. Referring to FIG. 2, a multipass coupler 240 includes a reflective polarizer 208 for reflecting light having a first polarization state and transmitting light having a second polarization state orthogonal to the first polarization state. The first and second polarization states may be orthogonal linear polarization states or circular polarization states of opposite handedness, for example.

A quarter-wave waveplate (QWP) 211 is disposed in an optical path between the reflective polarizer 208 and the tiltable reflector 106 and configured to convert a polarization state of light between the first and second polarization states upon a double-pass propagation through the QWP 211. In operation, the light beam 102 having the second polarization state PS2 propagates in sequence through the pupil-replicating waveguide 136, through the reflective polarizer 208 and the QWP 211, impinges onto the tiltable reflector 106 and is reflected by the tiltable reflector for the first time (event 231) to propagate again through the QWP 211 thereby converting to the first polarization state PS1, is reflected by the reflective polarizer 208, propagates through the QWP 211 and impinges onto the tiltable reflector for the second time, is reflected by the tiltable reflector for the second time (event 232) to propagate through the QWP 211 thereby converting back to the second polarization state PS2, and consequently propagates through the reflective polarizer 208 towards the pupil-replicating waveguide 136, where it is in-coupled to propagate in the pupil-replicating waveguide 136.

It is to be understood that the light beams 102 are shown in FIG. 2 vertically separated for illustration only. In an actual device, the light beams 102 may propagate along a same path at normal angle of incidence onto the tiltable reflector 106, and deviate from a same path at non-zero angles of incidence onto the tiltable reflector 106 in accordance with laws of reflection. An in-coupler, e.g. a grating in-coupler 342 shown in FIG. 3, may be used to in-couple the light beam 102 into the pupil-replicating waveguide 136. To make sure that the light beam 102 is not in-coupled into the pupil-replicating waveguide 136 at first incidence, the grating in-coupler 342 may include an opening 343. The light beam 102 may be focused onto the opening 343 to propagate through the grating in-coupler 342 substantially without loss.

Figure 4A:
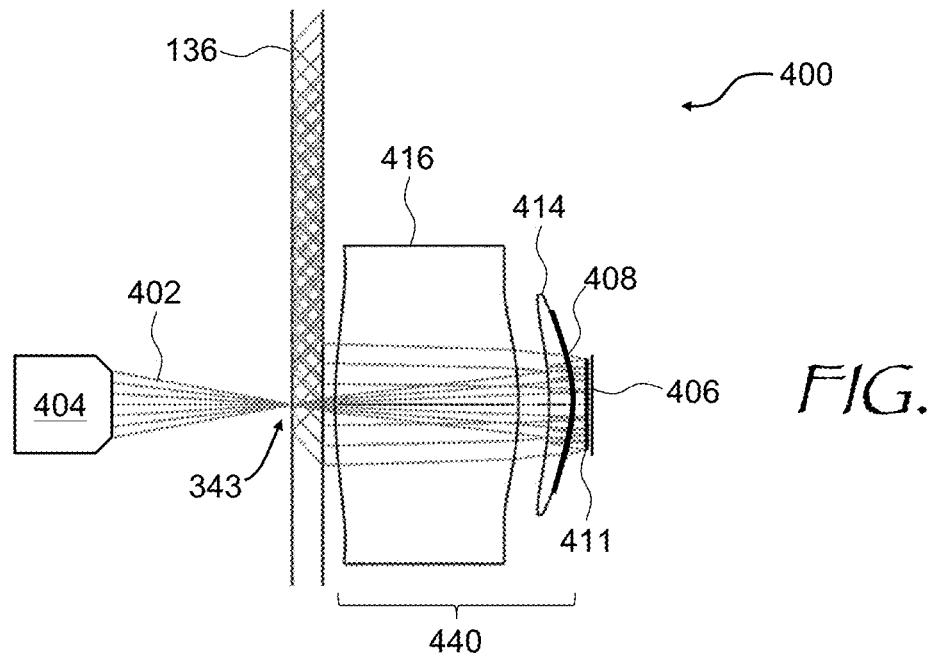
FIGS. 4A and 4B are ray-traced cross-sectional views of a near-eye display including a multipass scanner having the polarization configuration of FIG. 2 and the input coupler of FIG. 3 for a non-tilted (FIG. 4A) and tilted (FIG. 4B) tiltable reflector.
Figure 4B:
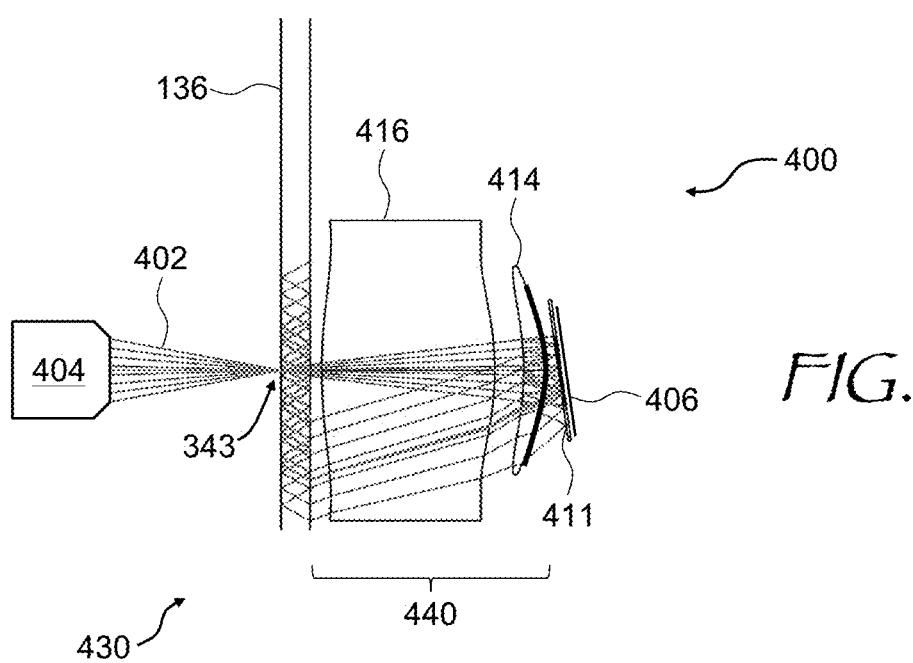

Implementations of the polarization-based multipass coupler 240 of FIG. 2 will now be considered. Referring to FIGS. 4A and 4B, a near-eye display 400 includes a multipass scanner 430 coupled to the pupil-replicating waveguide 136. The multipass scanner 430 includes a light source 404, a tiltable reflector 406, and a multipass coupler 440. The light source 404 is disposed on an opposite side of the pupil-replicating waveguide 136 than the tiltable reflector 406 and the multipass coupler 440. The multipass coupler 440 includes a first lens element 414 having positive optical power (i.e. focusing power). The first lens element 414 includes a convex surface proximate the tiltable reflector 406, and may include a concave opposite surface coaxial with the convex surface. The convex surface supports a reflective polarizer 408, which may be of a same shape as the convex surface of the first lens element 414. A QWP 411 is disposed between the reflective polarizer 408 and the tiltable reflector 406. The QWP 411 may be supported by a window of an enclosure, not shown, of the tiltable reflector 406, and may even be supported by the tiltable reflector 406 itself, or may be laminated to the reflective polarizer 408.

Figure 3:
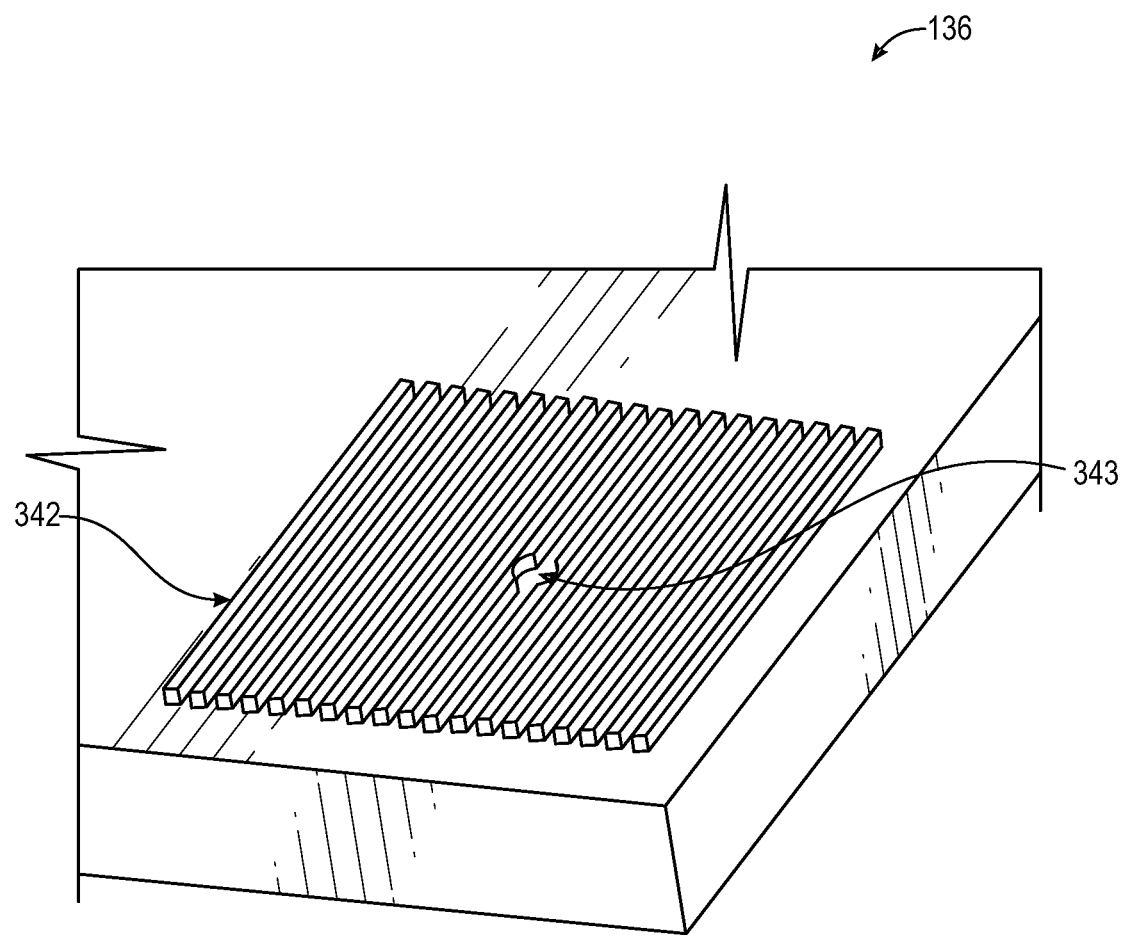
FIG. 3 is a three-dimensional view of an input coupler of a pupil-replicating waveguide including a small opening in the input coupler for propagating the light beam.

The multipass coupler 440 may further include a second lens element 416 disposed between the first lens element 414 and the exit pupil located proximate the pupil-replicating waveguide 136. In operation, the light source 404 provides a light beam 402 which converges onto the opening 343 in the input coupler 342 of the pupil-replicating waveguide 136 (FIG. 3). The light beam 402 (FIGS. 4A and 4B) propagates through the opening 343 and is coupled to the multi-pass coupler 440. Then, the light beam 402 propagates in sequence though the second lens element 416, through the first lens element 414, impinges onto and gets reflected by the tiltable reflector 406, is reflected by the reflective polarizer 408 to impinge onto and get reflected by the tiltable reflector 406 for the second time, propagates through the first lens element 414, propagates through the second lens element 416, and impinges onto the exit pupil of the multipass scanner 430 located at the pupil-replicating waveguide 136. The first 414 and second 416 lens elements surfaces may be optimized to provide the necessary collimation of the light beam 402 at the pupil-replicating waveguide 136. The above described optical path is defined by the position and orientation of the reflective polarizer 408 and the QWP 411, which are configured as described above with reference to FIG. 2.

Figure 5A:
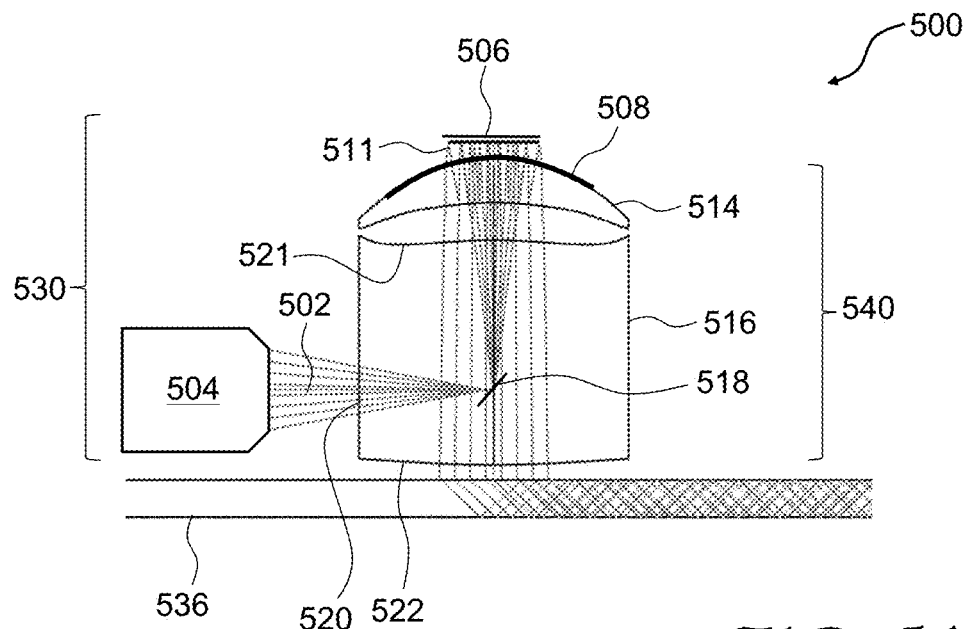
FIGS. 5A and 5B are ray-traced cross-sectional views of a near-eye display including a multipass scanner having the polarization configuration of FIG. 2 and including a small buried mirror for non-tilted (FIG. 5A) and tilted (FIG. 5B) tiltable reflector.
Figure 5B:
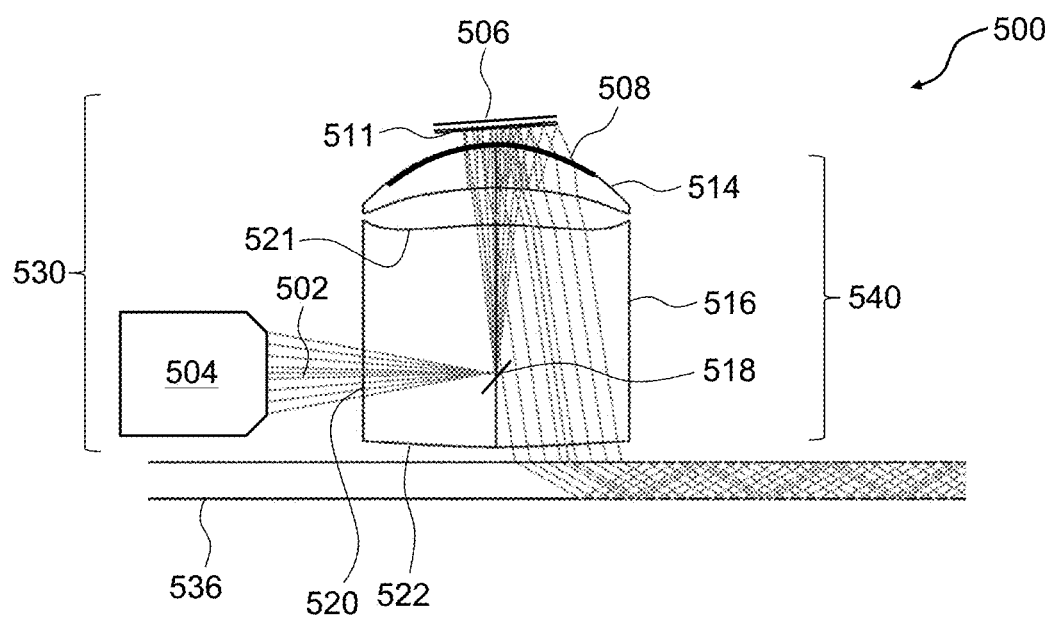

Turning now to FIGS. 5A and 5B, a near-eye display 500 includes a multipass scanner 530 coupled to a pupil-replicating waveguide 536. The multipass scanner 530 includes a light source 504, a tiltable reflector 506, and a multipass coupler 540. The light source 504 is disposed on a same side of the pupil-replicating waveguide 536 as the tiltable reflector 506 and the multipass coupler 540. The multipass coupler 540 includes a first lens element 514 having positive optical power. The first lens element 514 includes a convex surface proximate the tiltable reflector 506, and may include a concave opposite surface coaxial with the convex surface. The convex surface supports a reflective polarizer 508, which may be of a same shape as the convex surface of the first lens element 514. A QWP 511 is disposed between the reflective polarizer 508 and the tiltable reflector 506. The QWP 511 may be supported by a window of an enclosure, not shown, of the tiltable reflector 506, and may even be supported by the tiltable reflector 506 itself, or may be laminated to the reflective polarizer 408.

The multipass coupler 540 may further include a second lens element 516 having first 521 and second 522 coaxial optical surfaces, the first optical surface 521 facing the first lens element 514. A side face 520 may be disposed between the first 521 and second 522 optical surfaces for inputting the light beam 502 provided by the light source 504 into the second lens element 516. A buried turn mirror 518 may be disposed within the second lens element 516 in an optical path of the light beam 502 inputted through the side face 520 of the second lens element 516, for turning the light beam 502 towards the first optical surface 521 of the second lens element 516 and further through the first lens element 514.

The light beam 502 propagates through the side face 520 and is reflected by the buried turn mirror 518. Then, the light beam 402 propagates in sequence through the first surface 521 of the second lens element 516, through the first lens element 514, impinges onto and gets reflected by the tiltable reflector 506, is reflected by the reflective polarizer 508 to impinge onto and get reflected by the tiltable reflector 506 once again, propagates through the first lens element 514, propagates through the second lens element 516, and impinges onto the exit pupil of the multipass scanner 530 located at the pupil-replicating waveguide 536. The first 514 and second 516 lens elements surfaces may be optimized to provide the necessary collimation of the light beam 502 at the pupil-replicating waveguide 536. The above described optical path is defined by the position and orientation of the reflective polarizer 508 and the QWP 511, which are disposed in a configuration similar to one described above with reference to FIG. 2.

Referring to FIGS. 6A to 6E, a near-eye display 600 includes a multipass scanner 630 coupled to a pupil-replicating waveguide 636. The multipass scanner 630 includes a light source 604, a tiltable reflector 606, e.g. a packaged MEMS tiltable reflector having a window 607, and a multipass coupler 640. Similarly to the multipass coupler 440 of FIGS. 4A and 4B and the multipass coupler 540 of FIGS. 5A and 5B, the multipass coupler 640 of FIGS. 6A to 6R employs a polarization-based double reflection configuration of FIG. 2, in that it includes a reflective polarizer 608 for reflecting light having a first polarization state and transmitting light having a second polarization state orthogonal to the first polarization state, and a first QWP 611 disposed in an optical path between the reflective polarizer 608 and the tiltable reflector 606.

The multipass coupler 540 further includes a polarization beamsplitter (PBS) 658 for reflecting light having the first polarization state and transmitting light having the second polarization state, and first 661 and second 662 curved reflectors proximate adjoining surfaces of the PBS 658 for reflecting the light beam exiting the PBS 658 back towards the PBS 658. The first curved reflector 661 and the reflective polarizer 608 may be disposed on opposite sides of the PBS 658, i.e. below and above the PBS 658 in FIGS. 6A to 6E, and the second curved reflector 662 and the tiltable reflector 606 may be disposed on other opposite sides of the PBS 658, i.e. to the right and to the left of the PBS 658. The first curved reflector 661 and the second curved reflector 662 may each include a concave lens with a reflective coating on its distal (i.e. farthest from the PBS 658) convex surface. The reflective coating may include several coatings spaced apart in a direction of the optical axis of the reflector. Some of these coatings may be dichroic to selectively reflect light of a particular color channel of the image to be displayed. Such a configuration may be used to compensate for chromatic aberrations in the system.

The multipass coupler 540 further includes a second QWP 612 disposed in an optical path between the PBS 658 and the first curved reflector 661 and configured to convert a polarization state of light between the first and second polarization states upon a double-pass propagation through the second QWP 612, and a third QWP 613 disposed in an optical path between the PBS 658 and the second curved reflector 662 and configured to convert a polarization state of light between the first and second polarization states upon a double-pass propagation through the third QWP 613. The multipass coupler 540 may further include a first lens element 671 in an optical path between the PBS 658 and the tiltable reflector 606, and a second lens element 672 in an optical path between the PBS 658 and the reflective polarizer 608. The light propagation through the multipass coupler 540 involves seven passes through the PBS 658 and will be considered below in several steps depicted sequentially in FIGS. 6A, 6B, and 6C.

Figure 6A:
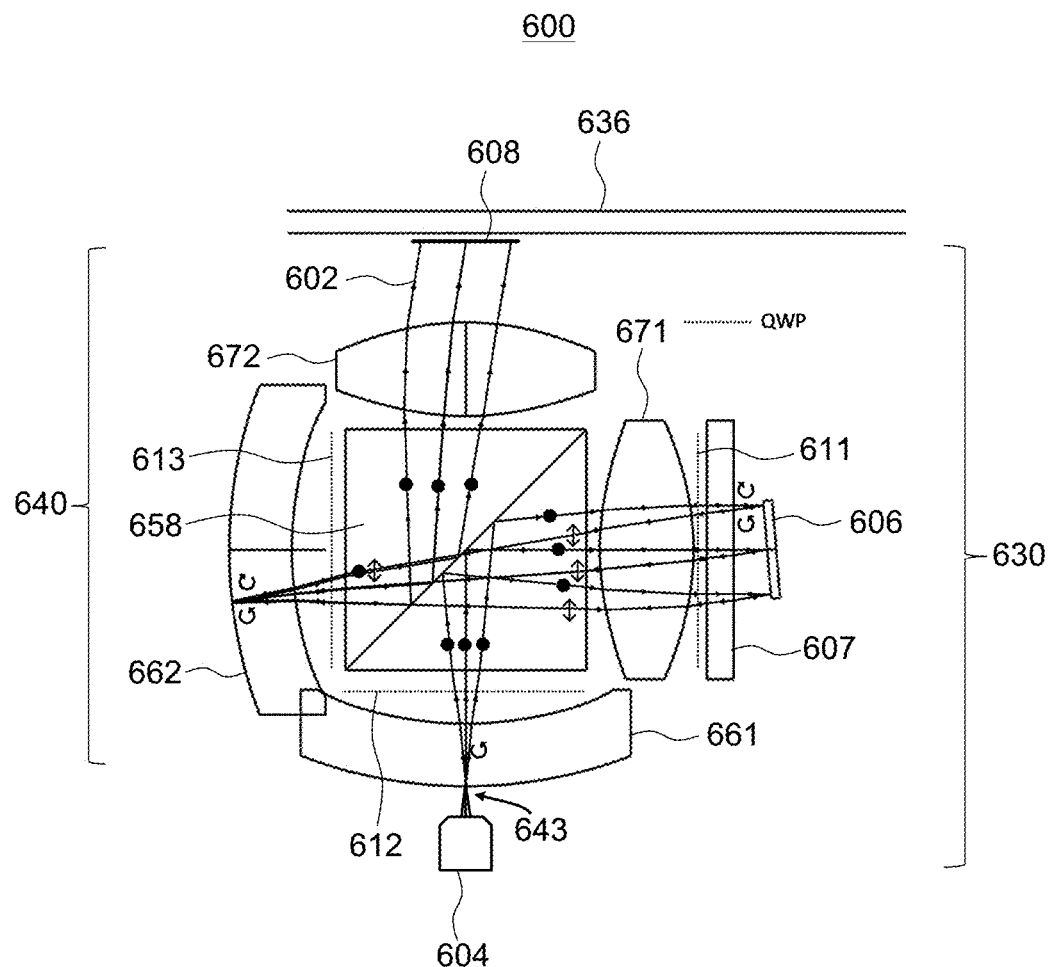
FIGS. 6A to 6D are ray-traced cross-sectional views of a near-eye display including a multipass scanner based on a polarization beamsplitter (PBS), illustrating the light propagation from the light source to the tiltable reflector to a reflective polarizer (FIG. 6A); from the reflective polarizer back to the tiltable reflector (FIG. 6B); from the tiltable reflector back through the reflective polarizer and to the pupil-replicating waveguide (FIG. 6C); and showing the entire folded optical path (FIG. 6D)

The first three passes of a light beam 602 emitted by the light source 604 through the PBS 658 are illustrated in FIG. 6A. Herein an in FIGS. 6B to 6E, the first polarization state is a linear polarization state oriented perpendicular to FIGS. 6A to 6E, and the second polarization state is a linear polarization state oriented in-plane of FIGS. 6A to 6E. The light beam 602 emitted by the light source 604 (FIG. 6A) is circularly polarized. The light beam 602 is focused to propagate through an opening 643 in the first curved reflector 661. Then, the light beam 602 propagates through the second QWP 612, impinges, while in the first polarization state, onto the PBS 658, is reflected by the PBS 658 towards the tiltable reflector 606, propagates through the first QWP 611, is reflected by the tiltable reflector 606 for the first time, propagates again through the first QWP 611 thereby converting to the second polarization state, propagates through the PBS 658 and the third QWP 613, impinges onto the second curved reflector 662, propagates again through the third QWP 613 thereby converting back to the first polarization state, and is accordingly reflected by the PBS 658 towards the reflective polarizer 608.

Figure 6B:
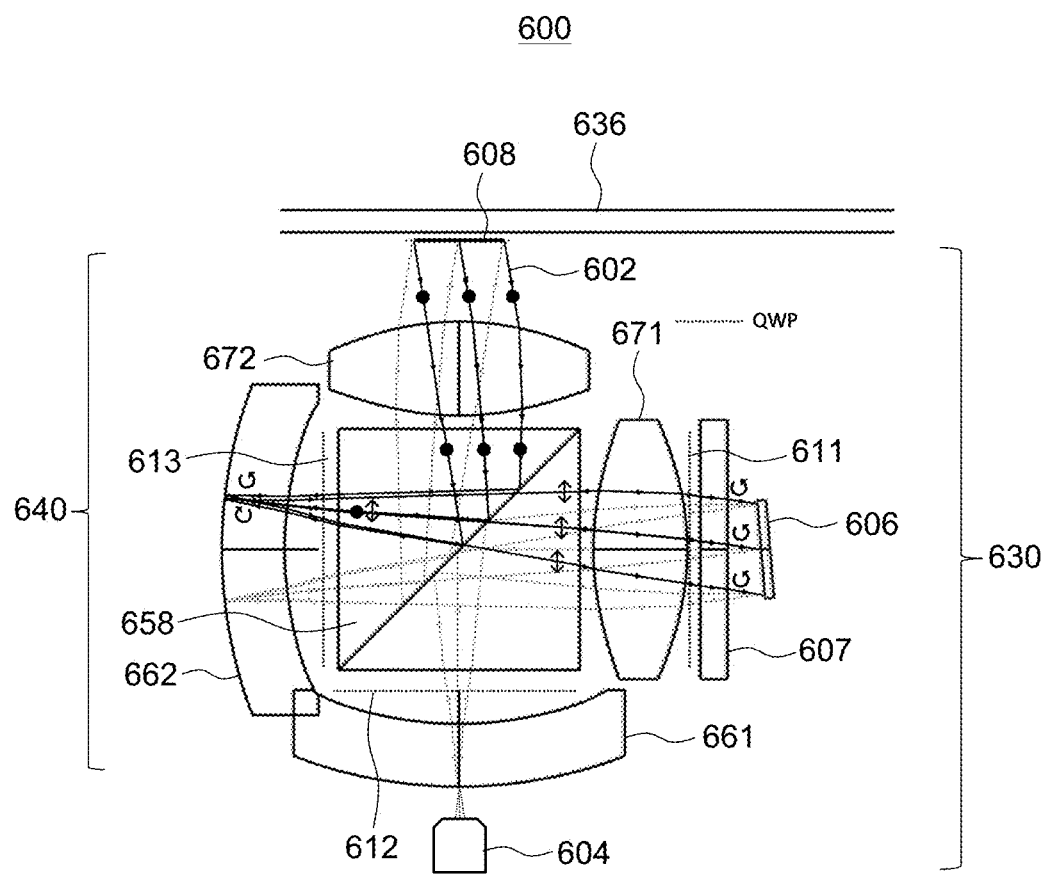

The next two passes of the light beam 602 through the PBS 658 are illustrated in FIG. 6B. The light beam 602 reflected by the PBS 658 towards the reflective polarizer 608 in the first polarization state propagates back towards the PBS 658 as shown, is reflected by the PBS 658 towards the second curved reflector 662, propagates through the third QWP 613, is reflected by the second curved reflector 662 to propagate again through the third QWP 613 thereby converting to the second polarization state, propagates through the PBS 658, through the first QWP 611, and is reflected by the tiltable reflector 606 for the second time towards the PBS 658.

Figure 6C:
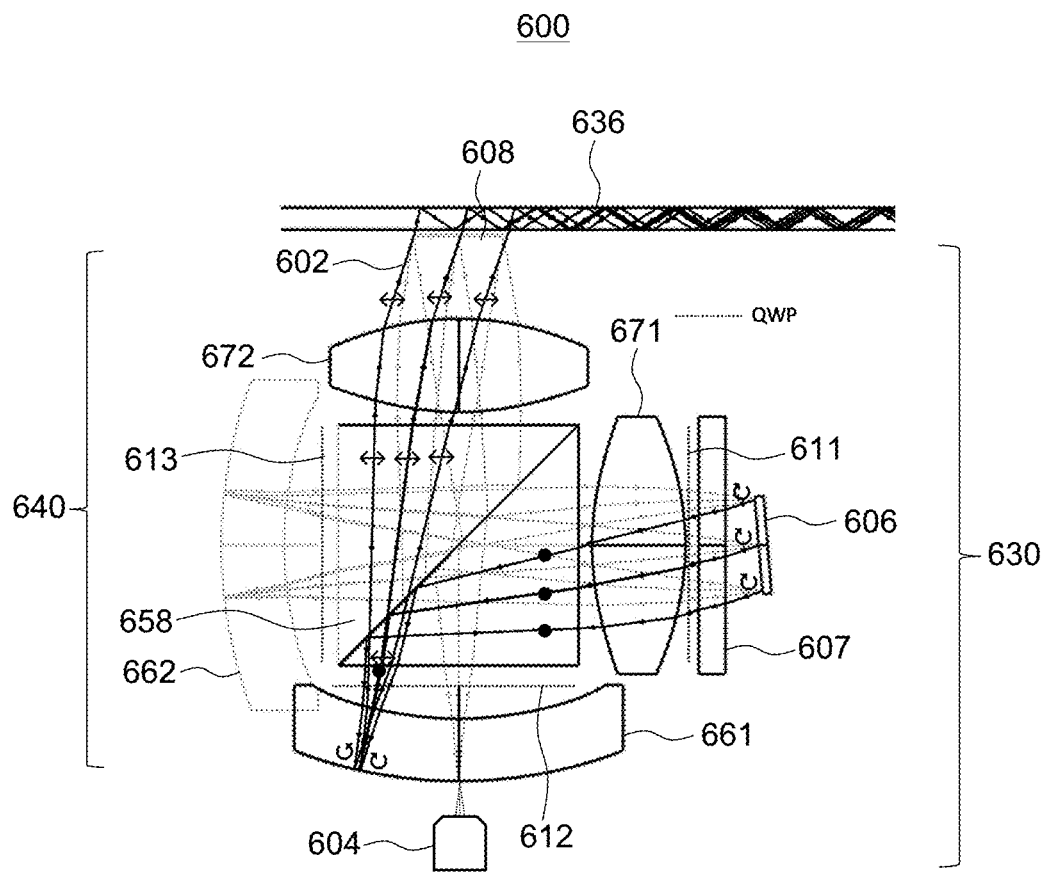

The final two passes of the light beam 602 through the PBS 658 are illustrated in FIG. 6C. The light beam 602 reflected y the tiltable reflector 606 for the second time propagates again through the first QWP 611 thereby converting to the first polarization state, is reflected by the PBS 658 to the first curved reflector 661, propagates through the second QWP 612, is reflected by the first curved reflector 661, propagates again through the second QWP 612 thereby converting to the second polarization state, propagates through PBS 658, and propagates through the reflective polarizer 608 to the exit pupil located proximate the pupil-replicating waveguide 636.

Figure 6D:
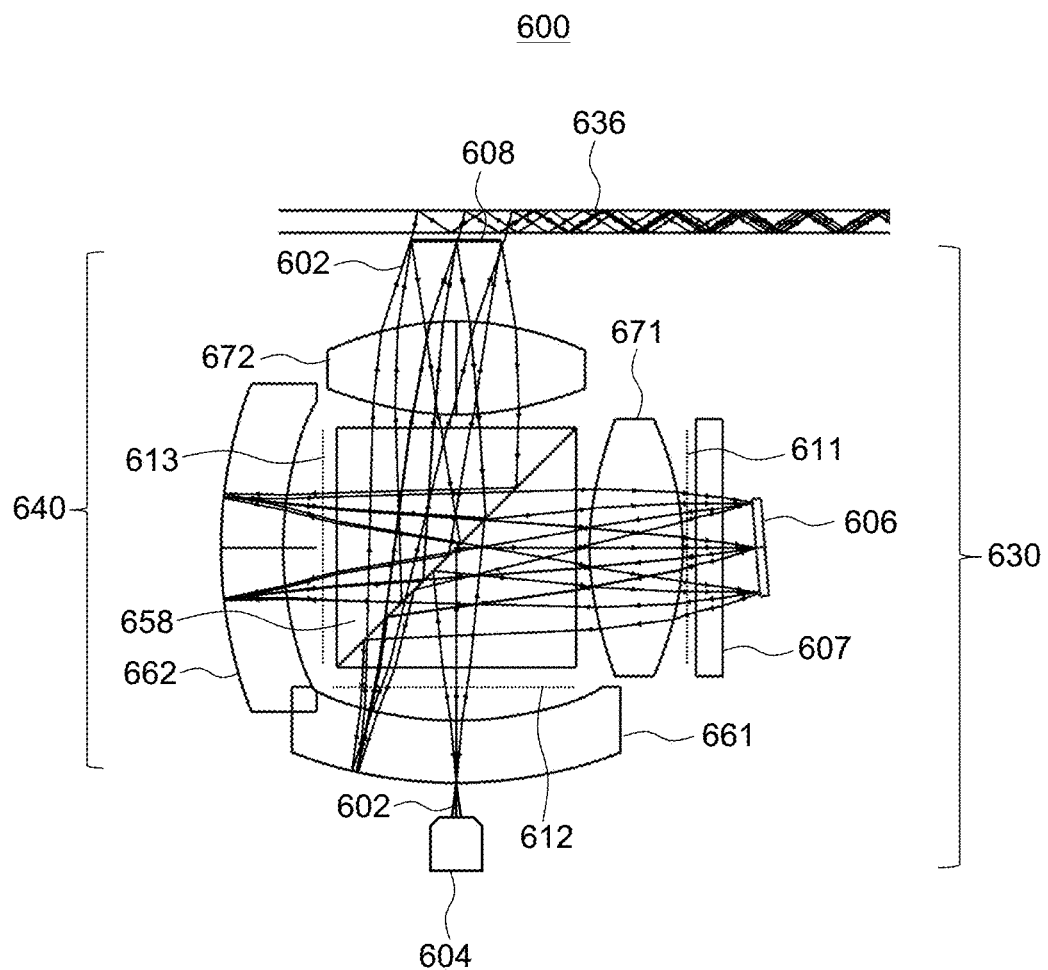
Figure 6E:
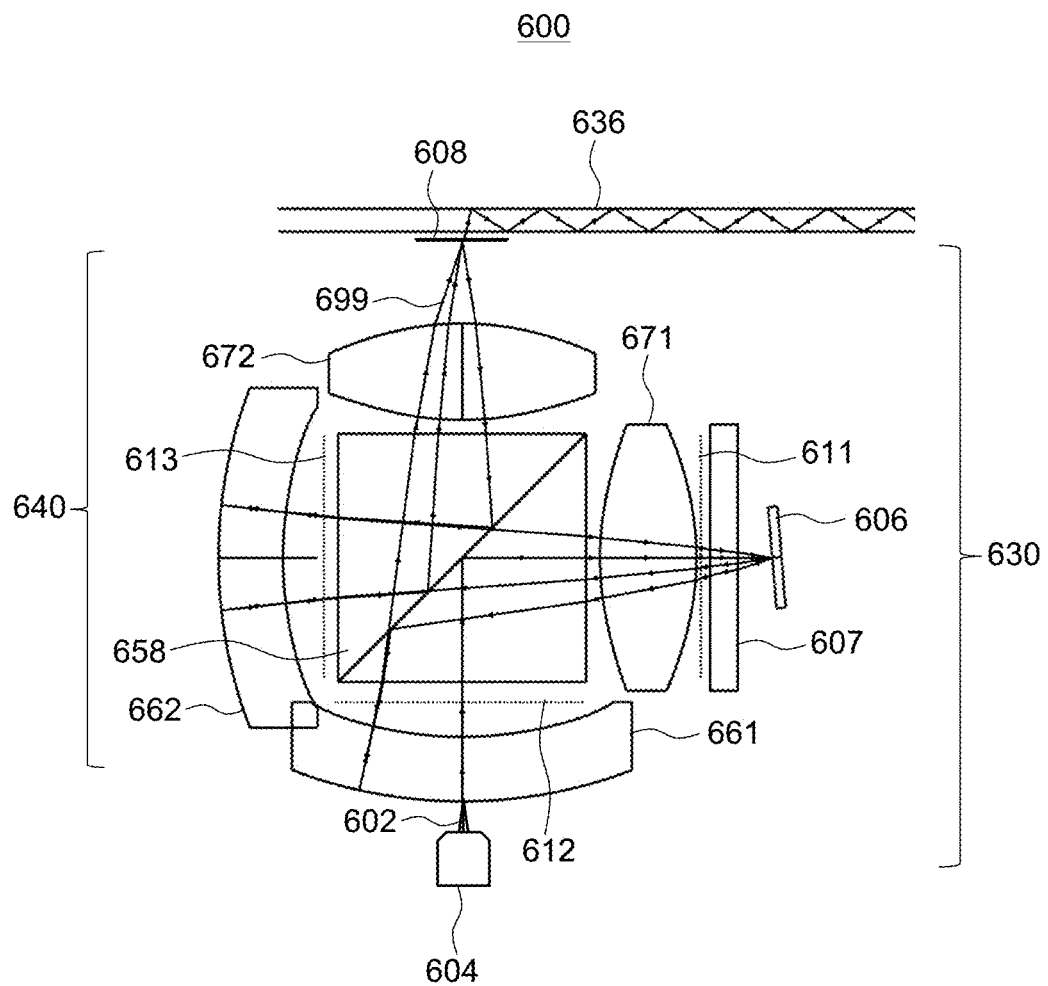
FIG. 6E is a ray-traced cross-sectional view of the near-eye display of FIGS. 6A to 6D showing the chief ray propagation through the system.

The entire optical path of the light beam 602 in the near-eye display 600 is illustrated in FIG. 6D. FIG. 6E shows the entire optical path of a chief ray 699 of the light beam 602. In summary, the chief ray 699 passes through one cube-width of optical path seven times. The first three passes through the cube are depicted in FIG. 6A, the following two passes are depicted in FIG. 6B, and the final two passes are depicted in FIG. 6C. Further, the pupil of tiltable reflector 606 is relayed first to a reflective polarizer 602, then relayed back onto itself (doubling the reflected angle), then relayed back to the reflective polarizer 608, this time transmitting to the pupil-replicating waveguide 636.

The multipass couplers 440 of FIGS. 4A and 4B, 540 of FIGS. 5A and 5B, and 640 of FIGS. 6A to 6E perform similar functions of firstly, coupling the light beam emitted by the light source to the tiltable reflector; secondly, coupling the light beam reflected by the tiltable reflector back to the tiltable reflector; and thirdly, coupling the light beam reflected multiple times from the tiltable reflector to the exit pupil, or to the pupil-replicating waveguide. Accordingly, the above multipass couplers may be described as each having a first coupler portion responsible for coupling light provided by the light source to the tiltable reflector; a second coupler portion for coupling light reflected by the tiltable reflector back to the tiltable reflector; and a third coupling portion for coupling light reflected multiple times from the tiltable reflector to the exit pupil. Different portions of the multipass couplers may share same optical elements. This is illustrated in FIGS. 7 and 8 considered below.

Figure 7:
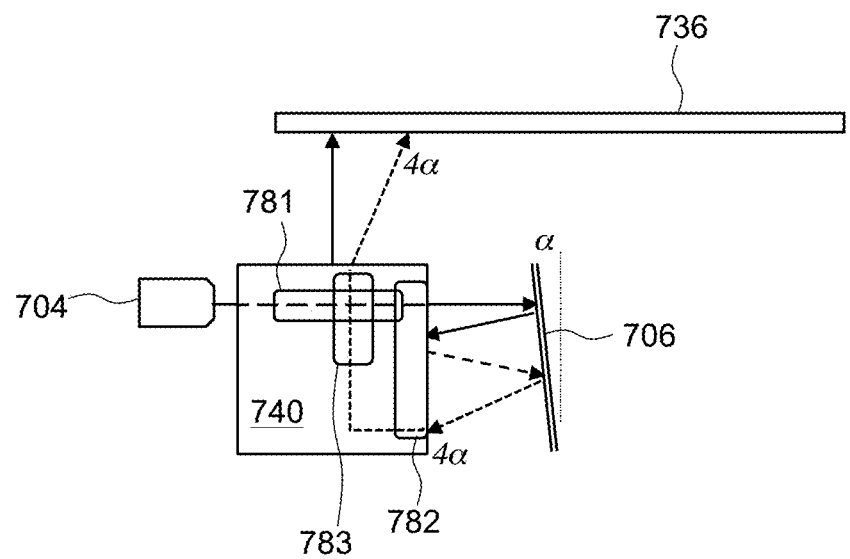
FIG. 7 is a schematic block diagram of a multipass scanner embodiment including a reflective polarizer for redirecting a reflected light beam back to a tiltable reflector.

Referring first to FIG. 7 with further reference to FIGS. 4A, 4B, 5A, and 5B, a multipass coupler 740 (FIG. 7) is representative of the multipass coupler 440 of FIGS. 4A and 4B and the multipass coupler 540 of FIGS. 5A and 5B. A first portion 781 (FIG. 7) of the multipass coupler 740 couplers light provided by a light source 704 to a tiltable reflector 706, which is shown in FIG. 7 tilted by an angle of tilt α. The first portion 781 may include e.g. the opening 343 in the pupil-replicating waveguide 136, and the first 414 and second 416 lens elements (FIGS. 4A and 4B); or the buried turning mirror 518 and the first 514 and second 516 lens elements (FIGS. 5A and 5B). A second portion 782 (FIG. 7) couples light reflected by the tiltable reflector 706 at twice the angle of tilt α back to the tiltable reflector 706. The light is coupled by a reflector reflecting the light from the tiltable reflector 706 back towards the tiltable reflector 706. For example, the reflective polarizer 408 (FIGS. 4A and 4B) reflects the light beam 402 back towards the tiltable reflector 406; and the reflective polarizer 508 of FIGS. 5A and 5B (FIGS. 5A and 5B) reflects the light beam 502 back towards the tiltable reflector 506. A third portion 783 (FIG. 7) of the multipass coupler 740 couples the light reflected for the second time at four times the angle of tilt α to the exit pupil located proximate a pupil-replicating waveguide 736. The third portion 783 may also include the first 414 and second 416 lens elements (FIGS. 4A and 4B); and the first 514 and second 516 lens elements (FIGS. 5A and 5B).

Figure 8:
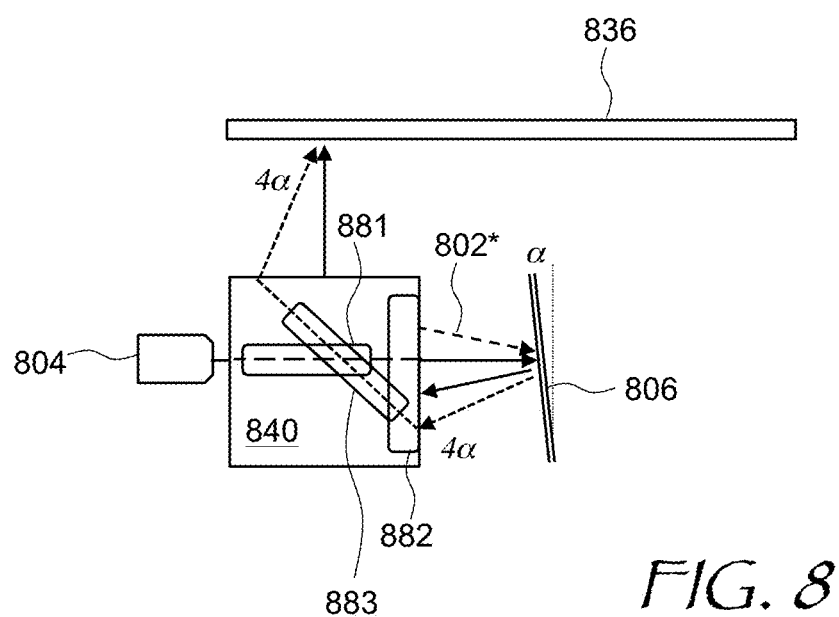
FIG. 8 is a schematic block diagram of a multipass scanner embodiment including a pupil auto-relay for redirecting a reflected light beam back to the tiltable reflector.

Referring now to FIG. 8 with further reference to FIGS. 6A to 6E, a multipass coupler 840 (FIG. 8) is representative of the multipass coupler 640 of FIGS. 6A to 6E. A first portion 881 of the multipass coupler 840 (FIG. 8) couplers light provided by a light source 804 to a tiltable reflector 806, which is shown in FIG. 8 tilted by the angle of tilt α. The first portion 881 may include e.g. the opening 643 in first curved reflector 661, the PBS 658, and the first lens element 671 (FIG. 6A). A second portion 882 (FIG. 8) couples light 802* reflected by the tiltable mirror at twice the angle of tilt α back to a same location on the tiltable mirror 706. In the multipass coupler 840, the light is coupled by a pupil auto-relay relaying the light 802* reflected by the tiltable reflector 806 for the first time back to the same location on the tiltable reflector 806. The pupil auto-relay is represented in the multipass coupler 640 of FIGS. 6A and 6B by the first lens element 671; the PBS 658; the second curved reflector 662 and the second lens element 672, which returns the light beam 602 to a same location on the tiltable reflector 606. A third portion 883 (FIG. 8) of the multipass coupler 840 couples the light reflected for the second time at four times the angle of tilt α to the exit pupil. The third portion 883 may also include the first lens element 671, the PBS 658, the first curved reflector 661, and the second lens element 672 (FIG. 6C). The third portion 883 is also a pupil relay, and as such it returns the light at four times the angle of tilt α back to a same location as at zero angle of tilt. Using the pupil relay(s) and/or pupil auto relay(s) is advantageous, because it allows one to reduce the size of the tiltable mirrors 606, 806 and the size of grating in-couplers of the pupil-replicating waveguides 636, 836.

Figure 9A:
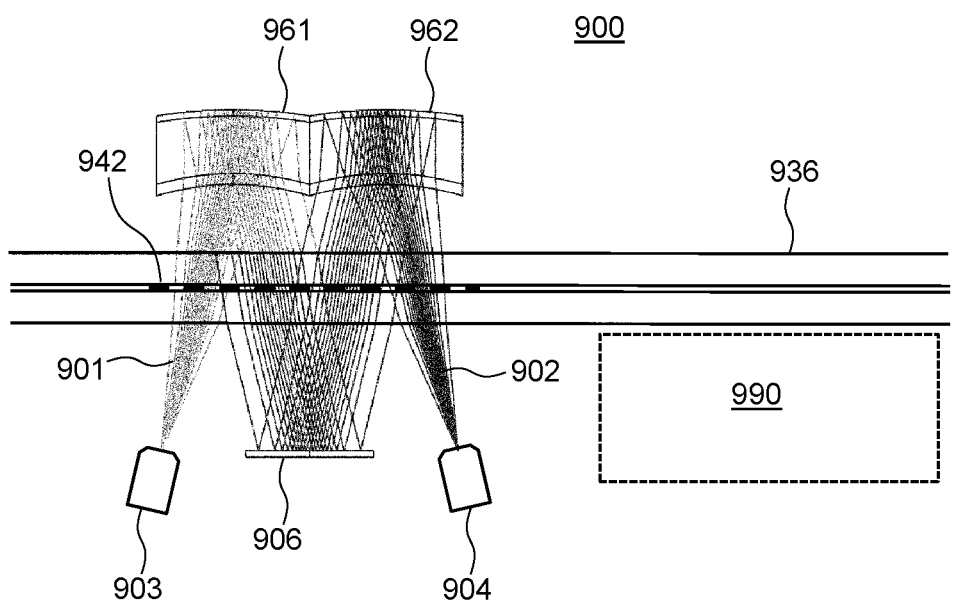
FIGS. 9A and 9B are ray-traced cross-sectional (FIG. 9A) and 3D wireframe (FIG. 9B) views of a near-eye display including a pair of curved reflectors for reflecting light beams towards the tiltable reflector through the pupil-replicating waveguide.

Referring to FIG. 9A, a near-eye display 900 includes a first light source 903 for providing a first light beam 901 and a second light source 904 for providing a second light beam 902. A tiltable reflector 906 is configured for reflecting the first 901 and second 902 light beams at a variable angle. A pupil-replicating waveguide 936 is configured to receive the first 901 and second 902 light beams tilted by the tiltable reflector 906, and expanding the first 901 and second 902 light beams over an eyebox 990 by providing multiple portions of the first 901 and second 902 light beams over the eyebox 990, thus enabling a user of the near-eye display 900 to comfortably view the image in angular domain provided by the near-eye display 900. The pupil-replicating waveguide 936 includes a polarization-selective in-coupler 942 for in-coupling light in a first polarization state into the pupil-replicating waveguide 936 while transmitting through light in a second polarization state orthogonal to the first polarization state.

The near-eye display 900 further includes a first curved reflector 961 configured to receive the first light beam 901 from the first light source 903 and reflect the first light beam 901 in the second polarization state towards the tiltable reflector 906 and through the polarization-selective in-coupler 942. Since the first light beam 901 generated by the first light source 903 is in the second polarization state, the first light beam 901 propagates through the in-coupler 942 substantially without coupling into the pupil-replicating waveguide 936.

Similarly, a second curved reflector may be configured for receiving the second light beam 902 from the second light source 904 and reflecting the second light beam 902 in the second polarization state towards the tiltable reflector 906 and through the polarization-selective in-coupler 942 substantially without coupling into the pupil-replicating waveguide 936. The first 903 and second 904 light sources are disposed on an opposite side of the pupil-replicating waveguide from the first 961 and second 962 curved reflectors. The first 961 and second 962 curved reflectors may be constructed similarly to the curved reflectors 661 and 662 of FIGS. 6A to 6E.

Upon reflection from the tiltable reflector, the first and second light beams convert to the first polarization state. The conversion may be facilitated by dedicated polarization conversion element(s) disposed in the optical path between the tiltable reflector 906 and the pupil-replicating waveguide 936. In some embodiments, the conversion may occur even without polarization-converting elements. For example, in embodiments where the first and second polarization states are circular polarization states of opposite handedness, the conversion from the second to first polarization state occurs upon reflection from the tiltable reflector 906, or any reflector for tat matter, because upon reflection, the phase relationship between the X- and Y-components of the optical electric field is preserved, while the direction of propagation is reversed, thereby changing the handedness of the circular polarization to an opposite handedness. Due to this, the first 901 and second 902 light beams are in-coupled by the in-coupler 942 into the pupil-replicating waveguide 936.

The first 901 and second 902 light beams generated by the first 903 and second 904 light sources, respectively, are scanned over different portions of the field of view (FOV) of the near-eye display 900, thereby expanding the overall FOV. The portions of the FOV may overlap thereby providing an area of redundancy, which may be used to provide an increased spatial resolution, overall brightness, etc.

Figure 9B:
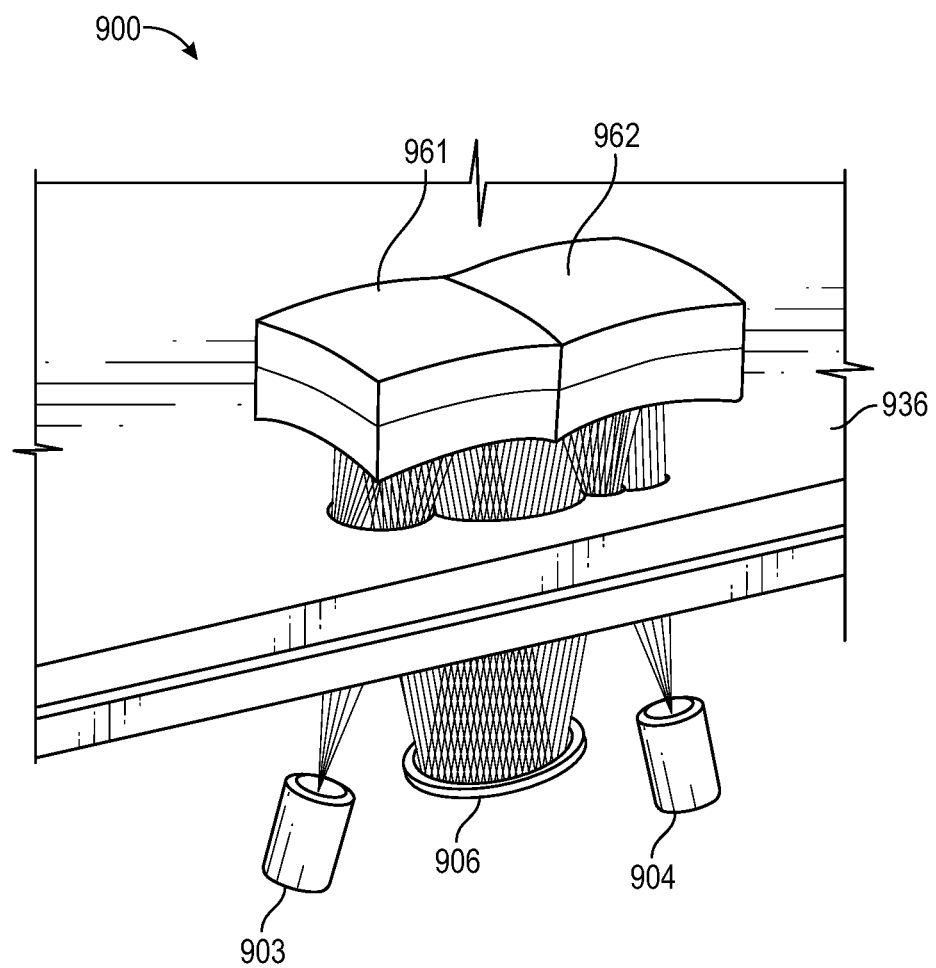
Figure 10A:
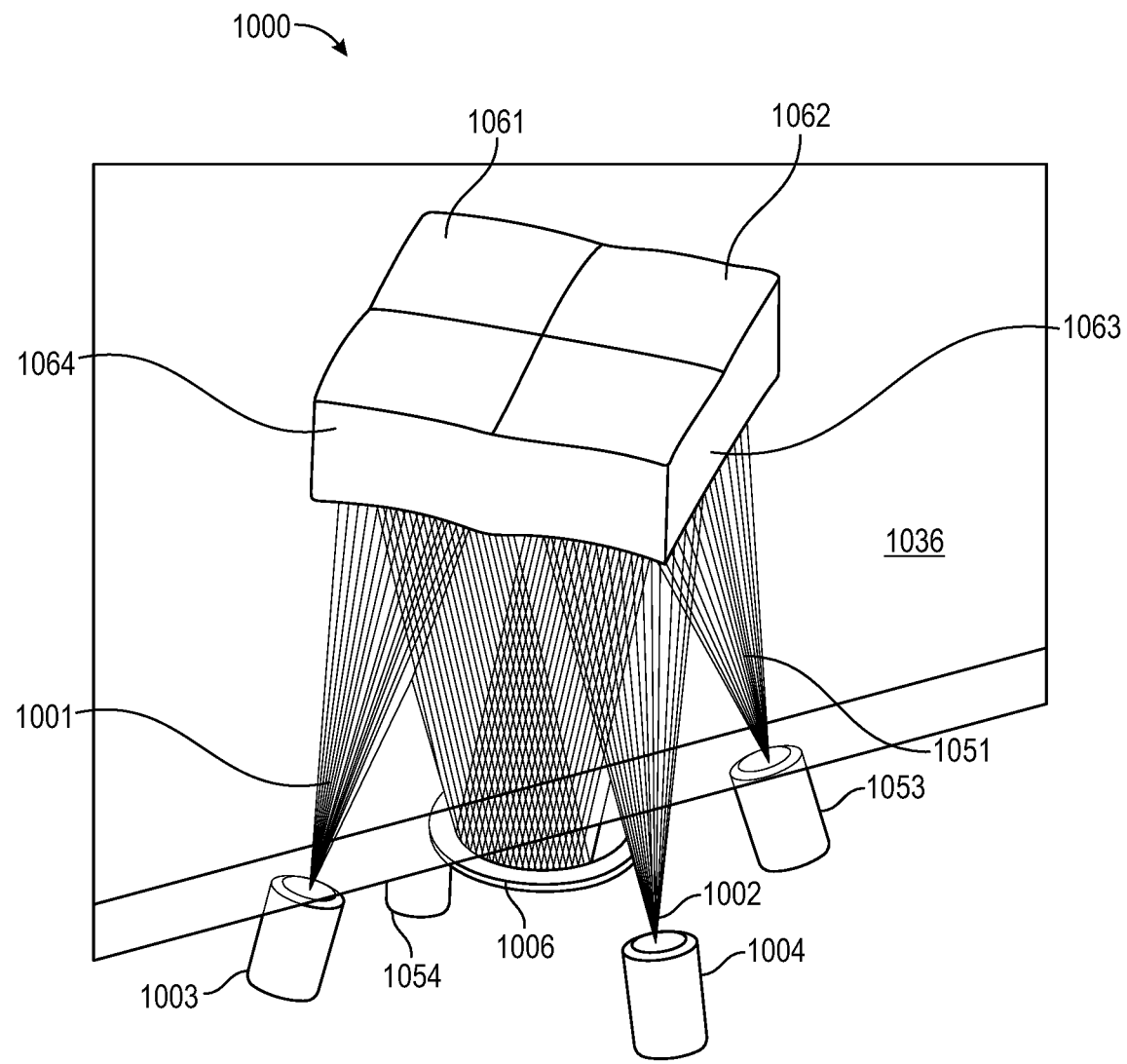
FIGS. 10A and 10B are ray-traced 3D solid (FIG. 10A) and 3D wireframe (FIG. 10B) views of a near-eye display including four curved reflectors for reflecting light beams towards the tiltable reflector through the pupil-replicating waveguide.
Figure 10B:
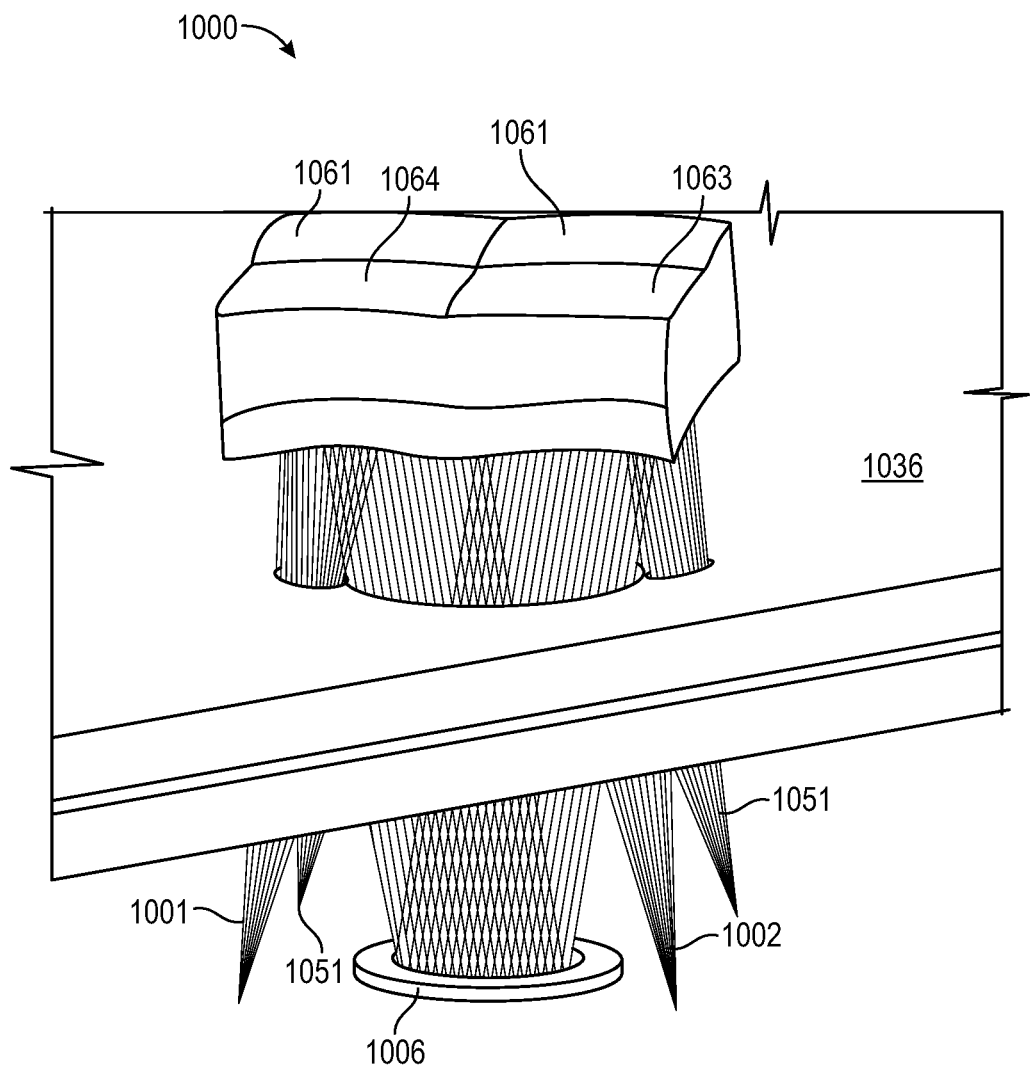

Referring to FIGS. 10A and 10B, a near-eye display 1000 is similar to the near-eye display 900 of FIG. 9, and includes similar elements, e.g. a pupil-replicating waveguide 1036, a tiltable mirror 1006, etc. The near-eye display 1000 of FIGS. 10A and 10B includes not two but four light sources 1003, 1004, 1053, 1054 for providing not two but four light beams 1001, 1002, 1051, and 1052 reflected by tiltable reflectors 1061, 16062, 1063, and 1064 respectively and scanned by the tiltable reflector 1006 over their corresponding FOV portions.

Figure 11A:
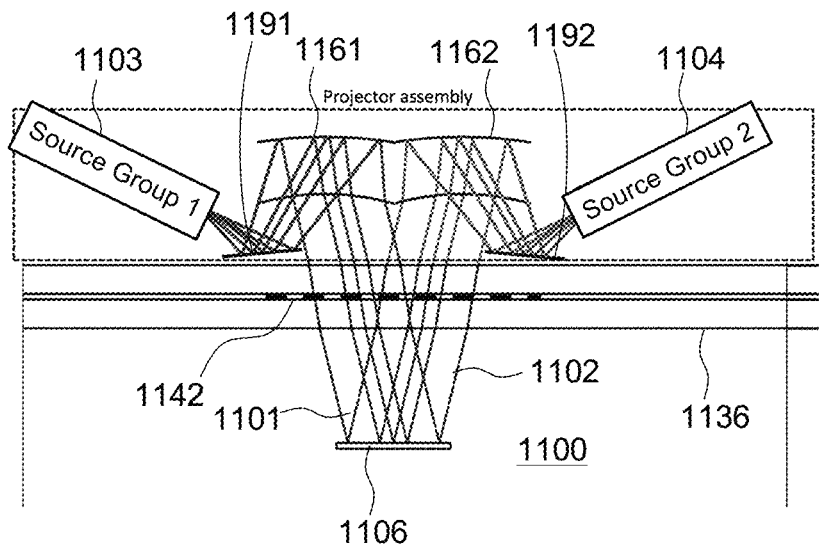
FIGS. 11A and 11B are ray-traced cross-sectional views of a near-eye display including a pair of curved reflectors for reflecting light beams towards the tiltable reflector and through the pupil-replicating waveguide, where the light sources are disposed on a same side of the pupil-replicating waveguide as the curved reflectors, for non-tilted (FIG. 11A) and tilted (FIG. 11B) tiltable reflector.
Figure 11B:
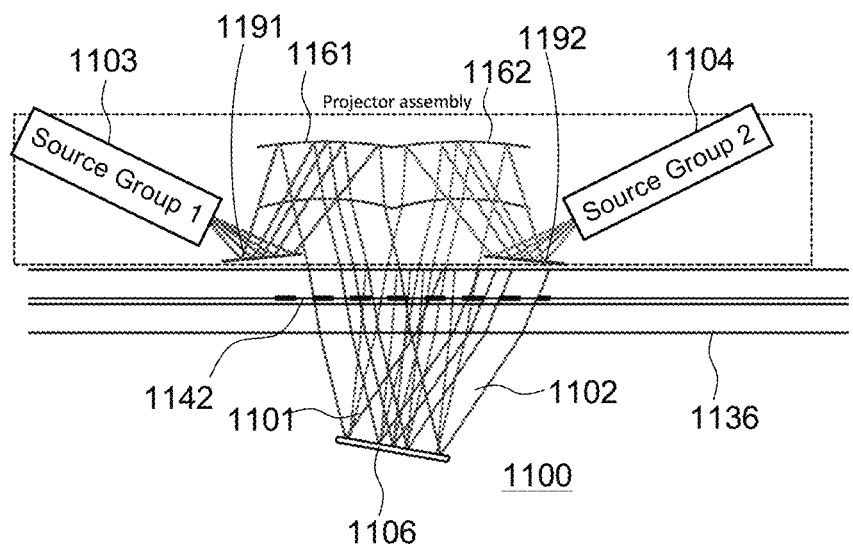

Turning to FIGS. 11A and 11B, a near-eye display 1100 is similar to the near-eye display 900 of FIG. 9 and includes similar elements, i.e. light sources 1103 and 1104, a pupil-replicating waveguide 1136 having a polarization-selective input coupler 1142, curved reflectors 1161 and 1162, and a tiltable reflector 1106 for reflecting at a variable angle light beams 1101 and 1102 emitted by the light sources 1103 and 1104, respectively, and collimated by curved reflectors 1161 and 1162, respectively. The near-eye display 1100 of FIGS. 11A and 11B further includes folding mirrors 1191 and 1192 disposed in an optical path between the light sources 1103 and 1104 and the curved reflectors 1161 and 1162, respectively. The folding mirrors 1191 and 1102 enable the light sources 1103 and 1104 to be disposed on a same side of the pupil-replicating waveguide as the curved reflectors 1161 and 1162, thereby reducing the number of passes of the light beams 1101 and 1102 through the pupil-replicating waveguide 1136. The light sources 1103 and 1104 may each include a group of individual emitters (Source Group 1 and Source Group 2, respectively); for that matter, the light sources 104 of FIG. 1, 404 of FIGS. 4A and 4B, 504 of FIGS. 5A and 5B, 604 of FIGS. 6A to 6E, 704 of FIGS. 7, 804 of FIGS. 8, 903 and 904 of FIGS. 9A and 9B, and 1003, 1004, 1053, and 1054 of FIG. 10A may also each include a plurality of emitters. Several emitters may be provided for each color channel.

Figure 12A:
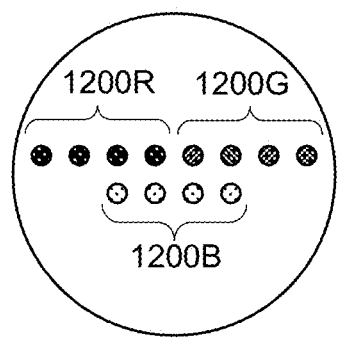
FIGS. 12A, 12B, and 12C are frontal views of multi-emitter light sources usable in near-eye displays disclosed herein.
Figure 12B:
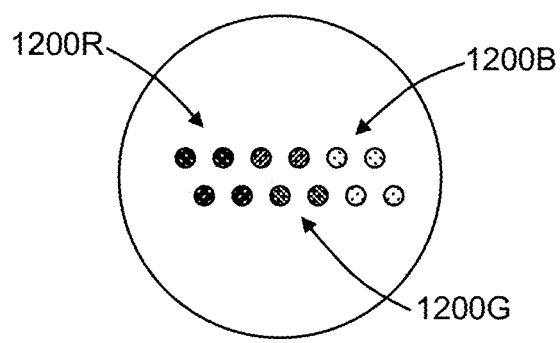
Figure 12C:
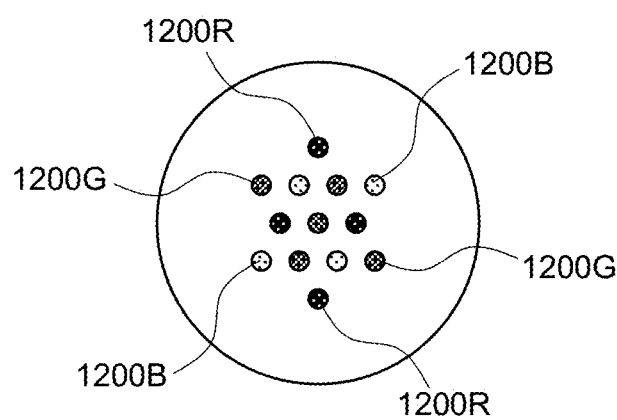

Referring to FIGS. 12A, 12B, and 12C, four red emitters 1200R may be provided for red (R) color channel (dark-shaded circles); four green emitters 1200G may be provided for green (G) color channel (medium-shaded circles); and four blue emitters 1200B may be provided for blue (B) color channel (light-shaded circles). The emitters 1200R, 1200G, and 1200B may each be ridge emitters sharing a common semiconductor substrate. The emitters 1200R, 1200G, and 1200B may be disposed in a line pattern (FIG. 12A); in a zigzag pattern (FIG. 12B); or in a honeycomb pattern (FIG. 12C), to name just a few examples.

Having a plurality of emitters illuminating a same tiltable reflector enables the scanning of the light beams generated by the emitters to be performed together as a group. When a light source includes a plurality of individual emitters, the illuminating light beam includes a plurality of sub-beams co-propagating at a slight angle w.r.t each other. Maximum angular cone of the sub-beams may be less than 5 degrees, or less than 2 degrees, or less than 1 degree in some embodiments. Multiple emitters and, in some cases, multiple light sources may be used to provide redundancy in case some of light sources fail, increase image resolution, increase overall image brightness, etc. Multiple light sources may each be equipped with its own collimator.

Figure 13A:
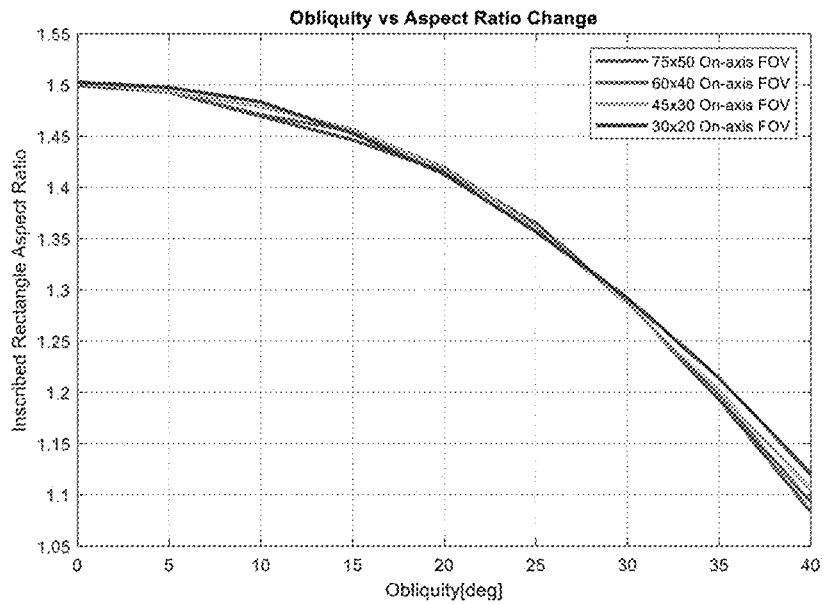
FIG. 13A is a graph of aspect ratio of a field of view (FOV) of a scanning projector display as a function of beam obliquity.
Figure 13B:
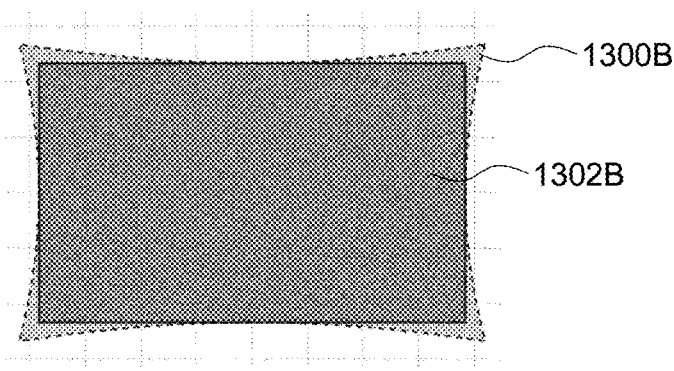
FIG. 13B is a schematic view of a FOV at zero obliquity in FIG. 13A.
Figure 13C:
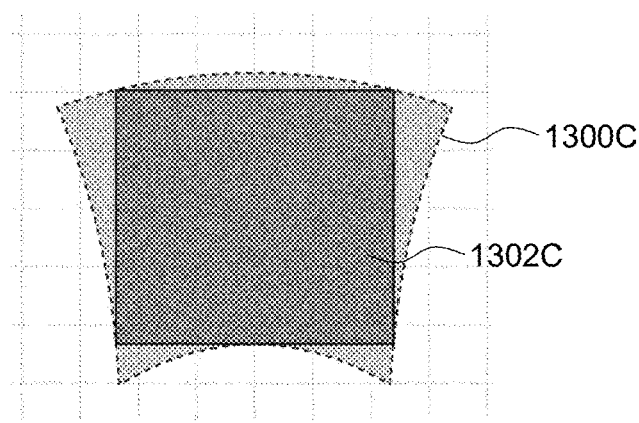
FIG. 13C is a schematic view of a FOV at a non-zero obliquity in FIG. 13A.

The near-eye displays 100 of FIG. 1, 400 of FIGS. 4A and 4B, 500 of FIGS. 5A and 5B, 600 of FIGS. 6A to 6E, 900 of FIGS. 9A and 9B, 1000 of FIGS. 10A and 10B, and 1100 of FIGS. 11A and 11B provide a low-obliquity coupling of light beam(s) to a tiltable reflector. Herein, the term "low obliquity" means a low angle of incidence, i.e. a normal incidence, at the tiltable reflector when in a nominal, e.g. a center or zero, angle of tilt. One advantage of having low obliquity is illustrated in FIGS. 13A to 13C. Referring first to FIG. 13A, an aspect ratio of a FOV of a projector using a tiltable reflector is plotted as a function of obliquity, i.e. angle of incidence at the tiltable reflector when in nominal or center position. The aspect ratio is plotted for four cases: 75 degrees by 50 degrees on-axis FOV; 60 degrees by 40 degrees on-axis FOV; 45 degrees by 30 degrees on-axis FOV; and 30 degrees by 20 degrees on-axis FOV. The aspect ratio drops from 1.5 at zero obliquity, i.e. normal incidence, to about 1.1 at 40 degrees obliquity angle.

FIG. 13B shows a zero-obliquity scanning angular area 1300B and an associated inscribed rectangular FOV 1302B. The zero-obliquity FOV 1302B solid angle is covering most of the angular area 1300B. By comparison, FIG. 13C shows a 40 degrees obliquity scanning angular area 1300C and an associated inscribed rectangular FOV 1302C. The FOV 1302C solid angle occupies a smaller percentage of the angular area 1300C, and is almost 2 times less than the zero-obliquity FOV 1302B, and has a different aspect ratio. Thus, the low-obliquity coupling improves the utilization of the scanning range of the tiltable reflector, enabling wider fields of view at the same scanning range of the tiltable reflector. It is to be noted that the tiltable reflector 106 of FIGS. 1 and 2, 406 of FIGS. 4A and 4B, 506 of FIGS. 5A and 5B, 606 of FIGS. 6A to 6E, 706 of FIG. 7, 806 of FIG. 8, 906 of FIGS. 9A and 9B, 1006 of FIGS. 10A and 10B, and 1106 of FIGS. 11A and 11B may be implemented as a MEMS tiltable reflectors.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

Figure 14A:
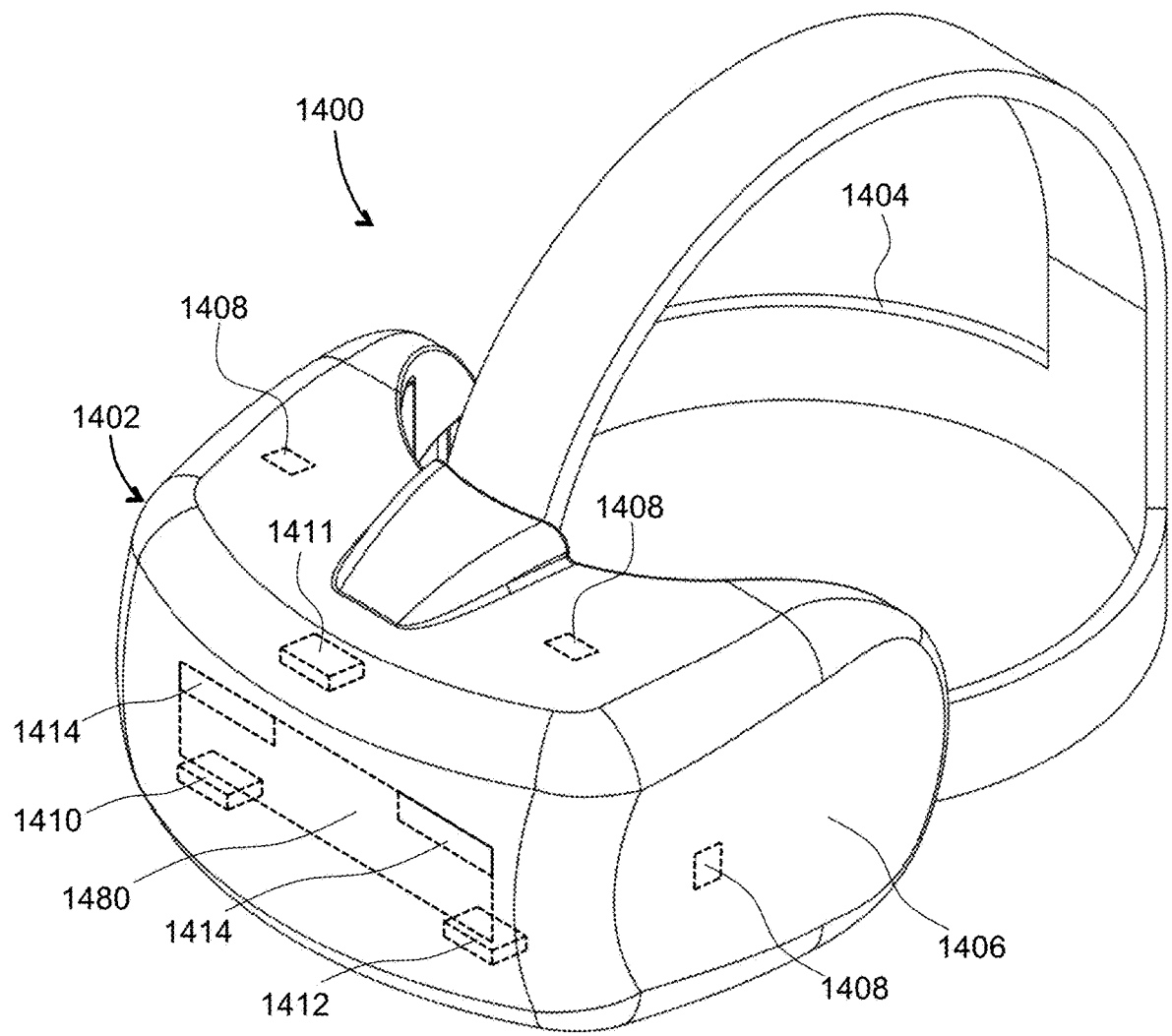
FIG. 14A is an isometric view of a head-mounted display headset of the present disclosure.

Referring to FIG. 14A, an HMD 1400 is an example of an AR/VR wearable display system which encloses the user's face, for a greater degree of immersion into the AR/VR environment. The HMD 1400 is an embodiment of the 100 of FIG. 1, 400 of FIGS. 4A and 4B, 500 of FIGS. 5A and 5B, 600 of FIGS. 6A to 6E, 900 of FIGS. 9A and 9B, 1000 of FIGS. 10A and 10B, and 1100 of FIGS. 11A and 11B, for example. The function of the HMD 1400 is to augment views of a physical, real-world environment with computer-generated imagery, and/or to generate the entirely virtual 3D imagery. The HMD 1400 may include a front body 1402 and a band 1404. The front body 1402 is configured for placement in front of eyes of a user in a reliable and comfortable manner, and the band 1404 may be stretched to secure the front body 1402 on the user's head. A display system 1480 may be disposed in the front body 1402 for presenting AR/VR imagery to the user. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. To that end, the DCA 1411 may include a laser radar (LIDAR), or a similar device. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Figure 14B:
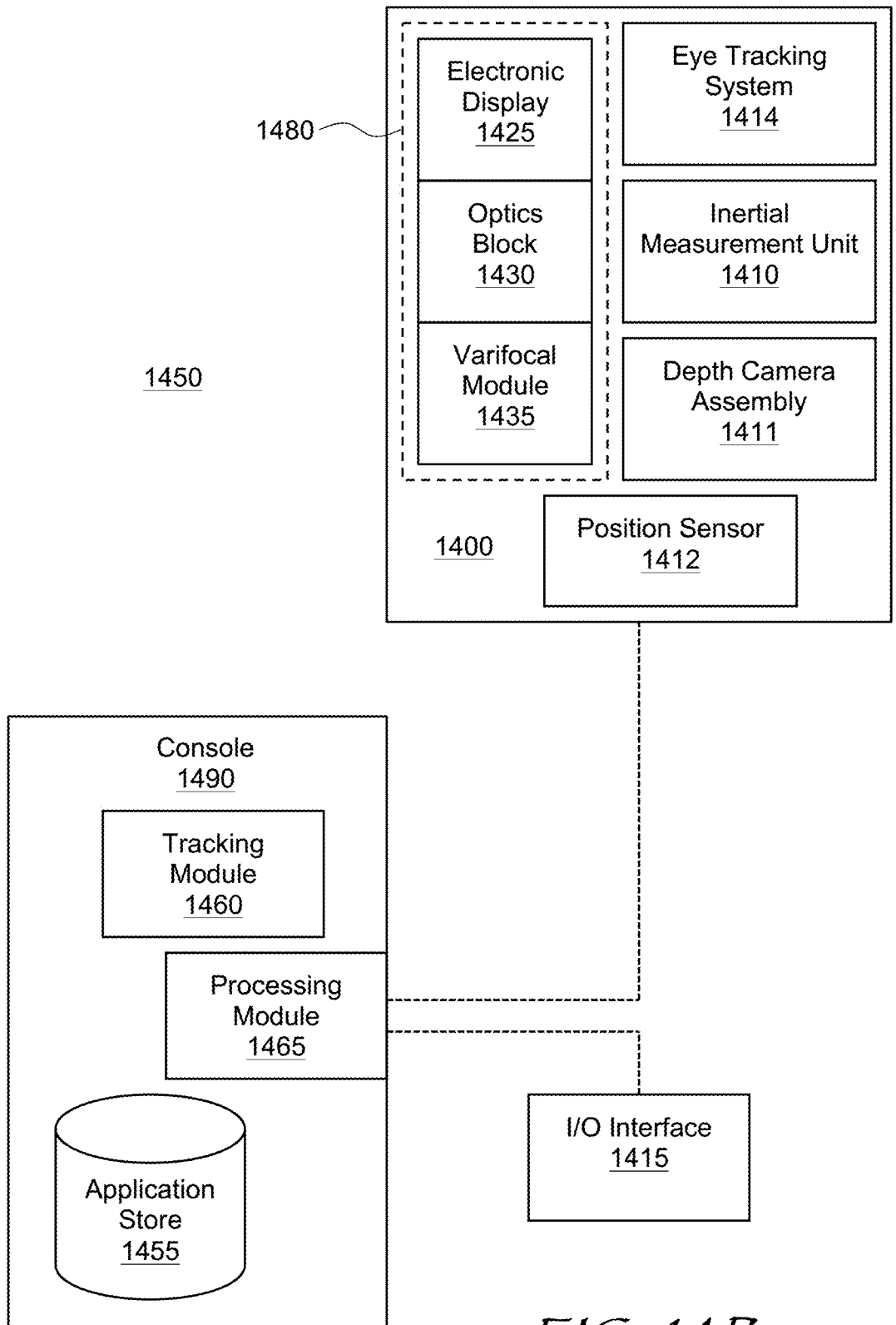
FIG. 14B is a block diagram of a virtual reality system including the headset of FIG. 14A.

Referring to FIG. 14B, an AR/VR system 1450 includes the HMD 1400 of FIG. 14A, an external console 1490 storing various AR/VR applications, setup and calibration procedures, 3D videos, etc., and an input/output (I/O) interface 1415 for operating the console 1490 and/or interacting with the AR/VR environment. The HMD 1400 may be "tethered" to the console 1490 with a physical cable, or connected to the console 1490 via a wireless communication link such as Bluetooth®, Wi-Fi, etc. There may be multiple HMDs 1400, each having an associated I/O interface 1415, with each HMD 1400 and I/O interface(s) 1415 communicating with the console 1490. In alternative configurations, different and/or additional components may be included in the AR/VR system 1450. Additionally, functionality described in conjunction with one or more of the components shown in FIGS. 14A and 14B may be distributed among the components in a different manner than described in conjunction with FIGS. 14A and 14B in some embodiments. For example, some or all of the functionality of the console 1415 may be provided by the HMD 1400, and vice versa. The HMD 1400 may be provided with a processing module capable of achieving such functionality.

As described above with reference to FIG. 14A, the HMD 1400 may include the eye tracking system 1414 (FIG. 14B) for tracking eye position and orientation, determining gaze angle and convergence angle, etc., the IMU 1410 for determining position and orientation of the HMD 1400 in 3D space, the DCA 1411 for capturing the outside environment, the position sensor 1412 for independently determining the position of the HMD 1400, and the display system 1480 for displaying AR/VR content to the user. The display system 1480 includes (FIG. 14B) an electronic display 1425, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The display system 1480 further includes an optics block 1430, whose function is to convey the images generated by the electronic display 1425 to the user's eye. The optics block may include various lenses, e.g. a refractive lens, a Fresnel lens, a diffractive lens, an active or passive Pancharatnam-Berry phase (PBP) lens, a liquid lens, a liquid crystal lens, etc., a pupil-replicating waveguide, grating structures, coatings, etc. The display system 1480 may further include a varifocal module 1435, which may be a part of the optics block 1430. The function of the varifocal module 1435 is to adjust the focus of the optics block 1430 e.g. to compensate for vergence-accommodation conflict, to correct for vision defects of a particular user, to offset aberrations of the optics block 1430, etc.

The I/O interface 1415 is a device that allows a user to send action requests and receive responses from the console 1490. An action request is a request to perform a particular action. For example, an action request may be an instruction to start or end capture of image or video data or an instruction to perform a particular action within an application. The I/O interface 1415 may include one or more input devices, such as a keyboard, a mouse, a game controller, or any other suitable device for receiving action requests and communicating the action requests to the console 1490. An action request received by the I/O interface 1415 is communicated to the console 1490, which performs an action corresponding to the action request. In some embodiments, the I/O interface 1415 includes an IMU that captures calibration data indicating an estimated position of the I/O interface 1415 relative to an initial position of the I/O interface 1415. In some embodiments, the I/O interface 1415 may provide haptic feedback to the user in accordance with instructions received from the console 1490. For example, haptic feedback can be provided when an action request is received, or the console 1490 communicates instructions to the I/O interface 1415 causing the I/O interface 1415 to generate haptic feedback when the console 1490 performs an action.

The console 1490 may provide content to the HMD 1400 for processing in accordance with information received from one or more of: the IMU 1410, the DCA 1411, the eye tracking system 1414, and the I/O interface 1415. In the example shown in FIG. 14B, the console 1490 includes an application store 1455, a tracking module 1460, and a processing module 1465. Some embodiments of the console 1490 may have different modules or components than those described in conjunction with FIG. 14B. Similarly, the functions further described below may be distributed among components of the console 1490 in a different manner than described in conjunction with FIGS. 14A and 14B.

The application store 1455 may store one or more applications for execution by the console 1490. An application is a group of instructions that, when executed by a processor, generates content for presentation to the user. Content generated by an application may be in response to inputs received from the user via movement of the HMD 1400 or the I/O interface 1415. Examples of applications include: gaming applications, presentation and conferencing applications, video playback applications, or other suitable applications.

The tracking module 1460 may calibrate the AR/VR system 1450 using one or more calibration parameters and may adjust one or more calibration parameters to reduce error in determination of the position of the HMD 1400 or the I/O interface 1415. Calibration performed by the tracking module 1460 also accounts for information received from the IMU 1410 in the HMD 1400 and/or an IMU included in the I/O interface 1415, if any. Additionally, if tracking of the HMD 1400 is lost, the tracking module 1460 may re-calibrate some or all of the AR/VR system 1450.

The tracking module 1460 may track movements of the HMD 1400 or of the I/O interface 1415, the IMU 1410, or some combination thereof. For example, the tracking module 1460 may determine a position of a reference point of the HMD 1400 in a mapping of a local area based on information from the HMD 1400. The tracking module 1460 may also determine positions of the reference point of the HMD 1400 or a reference point of the I/O interface 1415 using data indicating a position of the HMD 1400 from the IMU 1410 or using data indicating a position of the I/O interface 1415 from an IMU included in the I/O interface 1415, respectively. Furthermore, in some embodiments, the tracking module 1460 may use portions of data indicating a position or the HMD 1400 from the IMU 1410 as well as representations of the local area from the DCA 1411 to predict a future location of the HMD 1400. The tracking module 1460 provides the estimated or predicted future position of the HMD 1400 or the I/O interface 1415 to the processing module 1465.

The processing module 1465 may generate a 3D mapping of the area surrounding some or all of the HMD 1400 ("local area") based on information received from the HMD 1400. In some embodiments, the processing module 1465 determines depth information for the 3D mapping of the local area based on information received from the DCA 1411 that is relevant for techniques used in computing depth. In various embodiments, the processing module 1465 may use the depth information to update a model of the local area and generate content based in part on the updated model.

The processing module 1465 executes applications within the AR/VR system 1450 and receives position information, acceleration information, velocity information, predicted future positions, or some combination thereof, of the HMD 1400 from the tracking module 1460. Based on the received information, the processing module 1465 determines content to provide to the HMD 1400 for presentation to the user. For example, if the received information indicates that the user has looked to the left, the processing module 1465 generates content for the HMD 1400 that mirrors the user's movement in a virtual environment or in an environment augmenting the local area with additional content. Additionally, the processing module 1465 performs an action within an application executing on the console 1490 in response to an action request received from the I/O interface 1415 and provides feedback to the user that the action was performed. The provided feedback may be visual or audible feedback via the HMD 1400 or haptic feedback via the I/O interface 1415.

In some embodiments, based on the eye tracking information (e.g., orientation of the user's eyes) received from the eye tracking system 1414, the processing module 1465 determines resolution of the content provided to the HMD 1400 for presentation to the user on the electronic display 1425. The processing module 1465 may provide the content to the HMD 1400 having a maximum pixel resolution on the electronic display 1425 in a foveal region of the user's gaze. The processing module 1465 may provide a lower pixel resolution in other regions of the electronic display 1425, thus lessening power consumption of the AR/VR system 1450 and saving computing resources of the console 1490 without compromising a visual experience of the user. In some embodiments, the processing module 1465 can further use the eye tracking information to adjust where objects are displayed on the electronic display 1425 to prevent vergence-accommodation conflict and/or to offset optical distortions and aberrations.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A near-eye display for providing an image in angular domain at an eyebox, the near-eye display comprising:
   a first light source for providing a first light beam;
   a second light source for providing a second light beam;
   a tiltable reflector for reflecting the first and second light beams at a variable angle;
   a pupil-replicating waveguide for receiving the first and second light beams tilted by the tiltable reflector and expanding the first and second light beams over the eyebox by providing multiple portions of the first and second light beams over the eyebox, the pupil-replicating waveguide comprising a polarization-selective in-coupler for in-coupling light in a first polarization state while transmitting through light in a second polarization state orthogonal to the first polarization state;

a first curved reflector for receiving the first light beam from the first light source and reflecting the first light beam in the second polarization state towards the tiltable reflector and through the polarization-selective in-coupler; and a second curved reflector for receiving the second light beam from the second light source and reflecting the second light beam in the second polarization state towards the tiltable reflector and through the polarization-selective in-coupler;

wherein upon reflection from the tiltable reflector, the first and second light beams are in the first polarization state, whereby the first and second light beams are in-coupled into the pupil-replicating waveguide.

2. The near-eye display of claim 1, wherein the first and second light sources are disposed on an opposite side of the pupil-replicating waveguide from the first and second curved reflectors.

3. The near-eye display of claim 1, wherein the first and second curved reflectors share a common boundary therebetween.

4. The near-eye display of claim 1, wherein the first and second polarization states are circular polarization states of opposite handedness.

5. The near-eye display of claim 1, wherein in operation, the first and second light beams are scanned by the tiltable reflector over different portions of a field of view (FOV) of the near-eye display.

6. The near-eye display of claim 5, wherein the different FOV portions overlap providing an area of redundancy.

7. The near-eye display of claim 1, further comprising:
a first folding mirror in an optical path between the first light sources and the first curved reflector; and
a second folding mirror in an optical path between the second light sources and the second curved reflector.

8. The near-eye display of claim 1, further comprising:
a third light source for providing a third light beam;
a fourth light source for providing a fourth light beam;
a third curved reflector for receiving the third light beam from the third light source and reflecting the third light beam in the second polarization state towards the tiltable reflector and through the polarization-selective in-coupler; and
a fourth curved reflector for receiving the fourth light beam from the fourth light source and reflecting the fourth light beam in the second polarization state towards the tiltable reflector and through the polarization-selective in-coupler;
wherein upon reflection from the tiltable reflector, the third and fourth light beams are in the first polarization state, whereby the third and fourth light beams are in-coupled into the pupil-replicating waveguide.

9. The near-eye display of claim 8, wherein the first, second, third, and fourth light sources are disposed on an opposite side of the pupil-replicating waveguide from the first, second, third, and fourth curved reflectors.

10. The near-eye display of claim 8, wherein the first, second, third, and fourth curved reflectors share common boundaries therebetween.

11. The near-eye display of claim 8, wherein the first and second polarization states are circular polarization states of opposite handedness.

12. A near-eye display for providing an image in angular domain at an eyebox, the near-eye display comprising:

a plurality of light sources for providing a plurality of light beams;

a tiltable reflector for reflecting the plurality of light beams at a variable angle;

a pupil-replicating waveguide comprising a polarization-selective in-coupler for in-coupling light in a first polarization state while transmitting through light in a second, orthogonal polarization state;

a plurality of adjacent curved reflectors for receiving the plurality of light beams from the plurality of light sources and reflecting the plurality of light beams in the second polarization state through the polarization-selective in-coupler to impinge onto the tiltable reflector at different angles;

wherein upon reflection from the tiltable reflector, the plurality of light beams are in the first polarization state, whereby the plurality of light beams are in-coupled into the pupil-replicating waveguide.

13. The near-eye display of claim 12, wherein the first and second polarization states are circular polarization states of opposite handedness.

14. The near-eye display of claim 12, wherein in operation, the plurality of light beams are scanned by the tiltable reflector over different portions of a field of view (FOV) of the near-eye display.

15. The near-eye display of claim 14, wherein the different FOV portions overlap providing areas of redundancy.

16. The near-eye display of claim 12, wherein at least one of the plurality of light sources comprises a plurality of emitters.

17. The near-eye display of claim 16, wherein the plurality of emitters comprises emitters of different color channels.

18. A method for coupling light beams into a waveguide of a near-eye display, the waveguide comprising a polarization-selective in-coupler configured to in-couple light in a first polarization state while transmitting through light in a second polarization state orthogonal to the first polarization state, the method comprising:

collimating the light beams by a plurality of curved reflectors to provide collimated light beams;

redirecting the collimated light beams in the second polarization state through the polarization-selective in-coupler to impinge onto a common tiltable reflector;

reflecting, by the tiltable reflector, the collimated light beams at a variable angle to impinge onto the polarization-selective in-coupler; and in-coupling, by the polarization-selective in-coupler, the collimated light beams, wherein the collimated light beams are in the first polarization state after reflecting from the tiltable reflector.

19. The method of claim 18, further comprising scanning the first and second light beams by the tiltable reflector over different portions of a field of view (FOV) of the near-eye display.

20. The method of claim 18, wherein the first and second polarization states are circular polarization states of opposite handedness.

* * * * *